(12) United States Patent
Ly et al.

(10) Patent No.: US 11,974,274 B2
(45) Date of Patent: *Apr. 30, 2024

(54) AVAILABLE SLOTS FOR UPLINK SHARED CHANNEL REPETITIONS

(71) Applicant: QUALCOMM INCORPORATED, San Diego, CA (US)

(72) Inventors: Hung Dinh Ly, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,970

(22) Filed: May 24, 2023

(65) Prior Publication Data
US 2023/0397199 A1    Dec. 7, 2023

Related U.S. Application Data

(63) Continuation of application No. 17/314,621, filed on May 7, 2021, now Pat. No. 11,700,606.

(51) Int. Cl.
*H04W 72/1268* (2023.01)
*H04W 8/24* (2009.01)
*H04W 72/0446* (2023.01)
*H04W 72/1273* (2023.01)
(Continued)

(52) U.S. Cl.
CPC ......... *H04W 72/1268* (2013.01); *H04W 8/24* (2013.01); *H04W 72/0446* (2013.01); *H04W 72/1273* (2013.01); *H04W 72/535* (2023.01); *H04W 74/0833* (2013.01)

(58) Field of Classification Search
CPC ......... H04W 72/1268; H04W 72/1257; H04W 72/1247; H04W 72/1226; H04W 72/1205; H04W 72/1289; H04W 72/1273; H04W 72/1284; H04W 72/1278; H04W 72/0446; H04W 72/044; H04W 8/24; H04W 8/245; H04W 8/22; H04W 74/08; H04W 74/0833; H04W 74/0866
See application file for complete search history.

(56) References Cited

U.S. PATENT DOCUMENTS

| 2014/0362832 A1 | 12/2014 | Rudolf et al. |
| 2019/0230689 A1 | 7/2019 | Cao et al. |
| 2019/0349180 A1 | 11/2019 | Lu et al. |

(Continued)

FOREIGN PATENT DOCUMENTS

KR    20220046984 A    4/2022

*Primary Examiner* — Phong La
(74) *Attorney, Agent, or Firm* — Holland & Hart LLP/Qualcomm Incorporated

(57) ABSTRACT

Methods, systems, and devices for wireless communications are described. A user equipment (UE) may receive signaling from a base station including a configuration for multiple transmission time intervals (TTIs) including uplink symbols, downlink symbols, flexible symbols, or a combination. The UE may receive a grant scheduling one or more repetitions of an uplink shared channel carrying an uplink random access message from the base station. The UE may determine available TTIs for the repetitions based on a pre-TTI evaluation of symbols according to a rule that defines types of symbols available for the uplink shared channel. The UE may transmit the repetitions on the available TTIs according to the rule.

20 Claims, 16 Drawing Sheets

(51) Int. Cl.
*H04W 72/50* (2023.01)
*H04W 74/0833* (2024.01)

(56) References Cited

U.S. PATENT DOCUMENTS

| | | |
|---|---|---|
| 2020/0146034 A1 | 5/2020 | Bagheri et al. |
| 2020/0267667 A1 | 8/2020 | Molavianjazi et al. |
| 2020/0267756 A1* | 8/2020 | Fakoorian ............. H04W 72/23 |
| 2020/0351847 A1 | 11/2020 | Kim et al. |
| 2021/0014858 A1 | 1/2021 | Fakoorian et al. |
| 2021/0105809 A1 | 4/2021 | Park et al. |
| 2021/0400714 A1* | 12/2021 | Huang ................. H04L 1/1864 |
| 2021/0400719 A1 | 12/2021 | Oh et al. |
| 2022/0123902 A1 | 4/2022 | Panteleev et al. |
| 2022/0132495 A1 | 4/2022 | Bae et al. |
| 2022/0225360 A1* | 7/2022 | Yi ......................... H04W 72/23 |
| 2022/0225365 A1 | 7/2022 | Cozzo et al. |
| 2022/0361198 A1 | 11/2022 | Ly et al. |

\* cited by examiner

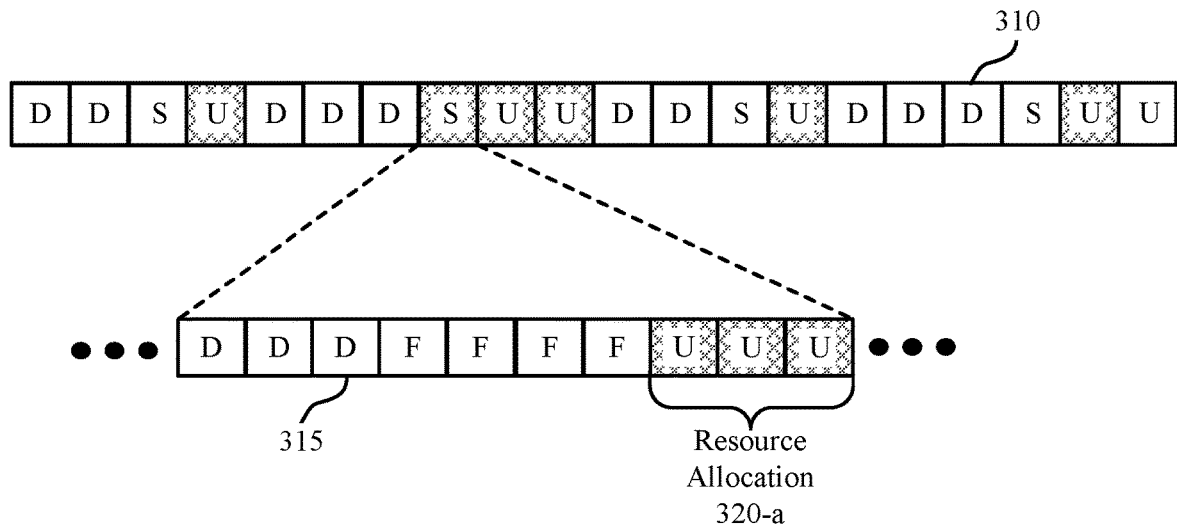
FIG. 3A
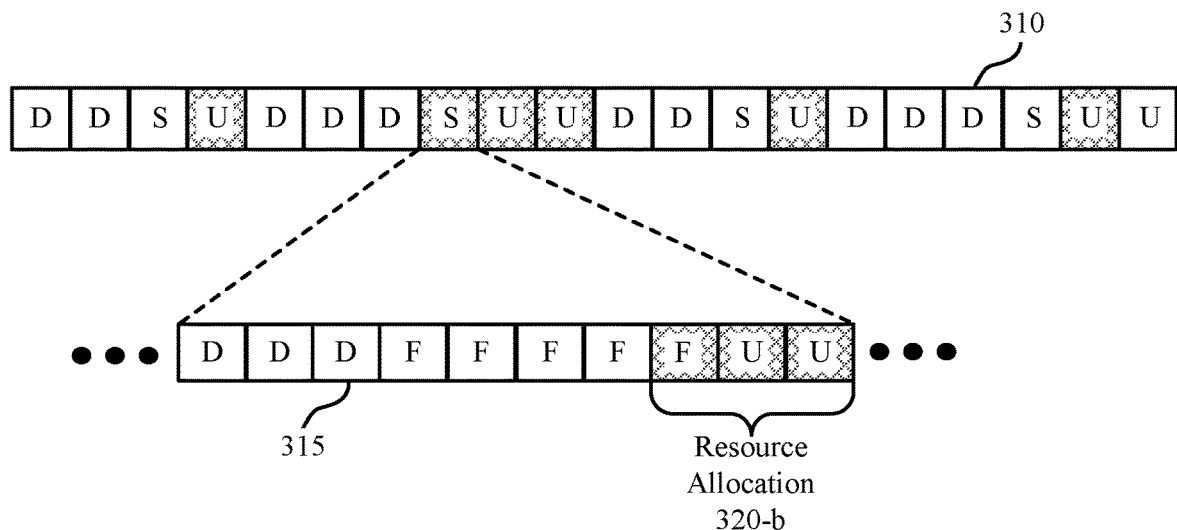
FIG. 3B
 PUSCH Repetition(s) 305

AVAILABLE SLOTS FOR UPLINK SHARED CHANNEL REPETITIONS

CROSS REFERENCE TO RELATED APPLICATIONS

The present application is a continuation application which claims priority to, and the benefit of U.S. application Ser. No. 17/314,621 entitled "AVAILABLE SLOTS FOR UPLINK SHARED CHANNEL REPETITIONS" filed on May 7, 2021, the contents of which are incorporated by reference in their entireties.

FIELD OF TECHNOLOGY

The following relates to wireless communications, including available slots for uplink shared channel repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support available slots for uplink shared channel repetitions. Generally, the described techniques provide for a user equipment (UE) to receive signaling from a base station, such that the UE may determine available transmission time intervals (TTIs) (e.g., slots) for an uplink shared channel (e.g., physical uplink shared channel (PUSCH)) carrying an uplink random access message. For example, the UE may receive control signaling including a TTI configuration and a scheduling grant for the PUSCH repetitions from a base station. The UE may determine one or more TTIs (e.g., slots) are available for the repetitions based on a rule that defines types of symbols to be considered. For example, the rule may specify that an available slot is a slot that includes consecutive uplink symbols satisfying a time-domain resource allocation for a PUSCH repetition. In some other examples, the rule may specify that an available slot is a slot that includes consecutive uplink symbols, flexible symbols, or both that together satisfy the time-domain resource allocation for a PUSCH repetition.

A method for wireless communications at a UE is described. The method may include receiving, from a base station, a configuration for a set of multiple TTIs that each include either uplink symbols, downlink symbols, flexible symbols, or combinations thereof, where a flexible symbol is configurable as either an uplink symbol or a downlink symbol, receiving a grant from the base station, the grant scheduling one or more repetitions of an uplink shared channel to carry an uplink random access message, determining, from the set of multiple TTIs, one or more corresponding TTIs for the one or more repetitions, the determining based on a per-TTI evaluation of symbols available for the uplink shared channel and based on a rule that defines types of symbols to be considered in the evaluation, and transmitting, to the base station, the one or more repetitions on the one or more corresponding TTIs.

An apparatus for wireless communications at a UE is described. The apparatus may include a processor, memory coupled with the processor, and instructions stored in the memory. The instructions may be executable by the processor to cause the apparatus to receive, from a base station, a configuration for a set of multiple TTIs that each include either uplink symbols, downlink symbols, flexible symbols, or combinations thereof, where a flexible symbol is configurable as either an uplink symbol or a downlink symbol, receive a grant from the base station, the grant scheduling one or more repetitions of an uplink shared channel to carry an uplink random access message, determine, from the set of multiple TTIs, one or more corresponding TTIs for the one or more repetitions, the determining based on a per-TTI evaluation of symbols available for the uplink shared channel and based on a rule that defines types of symbols to be considered in the evaluation, and transmit, to the base station, the one or more repetitions on the one or more corresponding TTIs.

Another apparatus for wireless communications at a UE is described. The apparatus may include means for receiving, from a base station, a configuration for a set of multiple TTIs that each include either uplink symbols, downlink symbols, flexible symbols, or combinations thereof, where a flexible symbol is configurable as either an uplink symbol or a downlink symbol, means for receiving a grant from the base station, the grant scheduling one or more repetitions of an uplink shared channel to carry an uplink random access message, means for determining, from the set of multiple TTIs, one or more corresponding TTIs for the one or more repetitions, the determining based on a per-TTI evaluation of symbols available for the uplink shared channel and based on a rule that defines types of symbols to be considered in the evaluation, and means for transmitting, to the base station, the one or more repetitions on the one or more corresponding TTIs.

A non-transitory computer-readable medium storing code for wireless communications at a UE is described. The code may include instructions executable by a processor to receive, from a base station, a configuration for a set of multiple TTIs that each include either uplink symbols, downlink symbols, flexible symbols, or combinations thereof, where a flexible symbol is configurable as either an uplink symbol or a downlink symbol, receive a grant from the base station, the grant scheduling one or more repetitions of an uplink shared channel to carry an uplink random access message, determine, from the set of multiple TTIs, one or more corresponding TTIs for the one or more repetitions, the determining based on a per-TTI evaluation of symbols available for the uplink shared channel and based on a rule that defines types of symbols to be considered in the evaluation, and transmit, to the base station, the one or more repetitions on the one or more corresponding TTIs.

In some examples of the method, apparatuses, and non-transitory computer-readable medium described herein, determining the one or more corresponding TTIs may include operations, features, means, or instructions for determining that the one or more corresponding TTIs each include one or more consecutive uplink symbols that satisfy a time domain scheduling request of the grant.

In some examples of the method, apparatuses, and non-transitory computer-readable medium described herein, satisfaction of the time domain scheduling request includes a determination that the one or more consecutive uplink symbols of each of the one or more corresponding TTIs allow for the one or more repetitions to each be transmitted on a same starting symbol within a respective TTI and may have a same transmit duration.

In some examples of the method, apparatuses, and non-transitory computer-readable medium described herein, determining the one or more corresponding TTIs may include operations, features, means, or instructions for determining that the one or more corresponding TTIs each include a combination of one or more consecutive uplink symbols and one or more consecutive flexible symbols that satisfy a time domain scheduling request of the grant.

In some examples of the method, apparatuses, and non-transitory computer-readable medium described herein, satisfaction of the time domain scheduling request includes a determination that the combination of the one or more consecutive uplink symbols and the one or more consecutive flexible symbols of each of the one or more corresponding TTIs allow for the one or more repetitions to each be transmitted on a same starting symbol within a respective TTI and may have a same transmit duration.

In some examples of the method, apparatuses, and non-transitory computer-readable medium described herein, determining the one or more corresponding TTIs may include operations, features, means, or instructions for determining that the rule defines that only the uplink symbols may be to be considered in the evaluation.

In some examples of the method, apparatuses, and non-transitory computer-readable medium described herein, determining the one or more corresponding TTIs may include operations, features, means, or instructions for determining that the rule defines that both the uplink symbols and a subset of the flexible symbols may be to be considered in the evaluation, where the subset of the flexible symbols excludes flexible symbols configured as synchronization signal/physical broadcast channel (SS/PBCH) block symbols.

Some examples of the method, apparatuses, and non-transitory computer-readable medium described herein may further include operations, features, means, or instructions for receiving an indication of the rule in either a system information block or a radio resource control message, where the indication pertains to the per-TTI evaluation for all of the set of multiple TTIs.

In some examples of the method, apparatuses, and non-transitory computer-readable medium described herein, the indication may be a one-bit indication that may be indicative of whether flexible symbols may be to be considered in the evaluation.

Some examples of the method, apparatuses, and non-transitory computer-readable medium described herein may further include operations, features, means, or instructions for receiving a bit map that indicates the rule for each special TTI of the set of multiple TTIs, the bit map received in either a system information block or a radio resource control message, where the bit map may be indicative of whether flexible symbols may be to be considered in the evaluation on a per-special TTI basis, and where a special TTI includes at least one flexible symbol.

In some examples of the method, apparatuses, and non-transitory computer-readable medium described herein, periodically applying the bit map within sets of TTIs within the set of multiple TTIs.

Some examples of the method, apparatuses, and non-transitory computer-readable medium described herein may further include operations, features, means, or instructions for receiving, from the base station, a message including capability information corresponding to a capability of the base station to simultaneously transmit and receive signaling, where determining the one or more corresponding TTIs may be based on the capability information.

In some examples of the method, apparatuses, and non-transitory computer-readable medium described herein, the grant schedules a Msg3 transmission in a four-step random access procedure, a Msg3 retransmission in the four-step random access procedure, or both.

In some examples of the method, apparatuses, and non-transitory computer-readable medium described herein, the set of multiple TTIs include a set of slots in a frame or a set of slots in a set of multiple frames.

A method for wireless communications at a base station is described. The method may include transmitting, to a UE, a configuration for a set of multiple TTIs that each include either uplink symbols, downlink symbols, flexible symbols, or combinations thereof, where a flexible symbol is configurable as either an uplink symbol or a downlink symbol, transmitting a grant to the UE, the grant scheduling one or more repetitions of an uplink shared channel to carry an uplink random access message, determining, from the set of multiple TTIs, one or more corresponding TTIs for the one or more repetitions, the determining based on a per-TTI evaluation of symbols available for the uplink shared channel and based on a rule that defines types of symbols to be considered in the evaluation, and receiving, from the UE, the one or more repetitions on the one or more corresponding TTIs.

An apparatus for wireless communications at a base station is described. The apparatus may include a processor, memory coupled with the processor, and instructions stored in the memory. The instructions may be executable by the processor to cause the apparatus to transmit, to a UE, a configuration for a set of multiple TTIs that each include either uplink symbols, downlink symbols, flexible symbols, or combinations thereof, where a flexible symbol is configurable as either an uplink symbol or a downlink symbol, transmit a grant to the UE, the grant scheduling one or more repetitions of an uplink shared channel to carry an uplink random access message, determine, from the set of multiple TTIs, one or more corresponding TTIs for the one or more repetitions, the determining based on a per-TTI evaluation of symbols available for the uplink shared channel and based on a rule that defines types of symbols to be considered in the evaluation, and receive, from the UE, the one or more repetitions on the one or more corresponding TTIs.

Another apparatus for wireless communications at a base station is described. The apparatus may include means for transmitting, to a UE, a configuration for a set of multiple TTIs that each include either uplink symbols, downlink symbols, flexible symbols, or combinations thereof, where a flexible symbol is configurable as either an uplink symbol or a downlink symbol, means for transmitting a grant to the UE, the grant scheduling one or more repetitions of an uplink shared channel to carry an uplink random access message, means for determining, from the set of multiple TTIs, one or more corresponding TTIs for the one or more repetitions, the determining based on a per-TTI evaluation of symbols available for the uplink shared channel and based on a rule that defines types of symbols to be considered in the evaluation, and means for receiving, from the UE, the one or more repetitions on the one or more corresponding TTIs.

A non-transitory computer-readable medium storing code for wireless communications at a base station is described. The code may include instructions executable by a processor to transmit, to a UE, a configuration for a set of multiple TTIs that each include either uplink symbols, downlink symbols, flexible symbols, or combinations thereof, where a flexible symbol is configurable as either an uplink symbol or a downlink symbol, transmit a grant to the UE, the grant scheduling one or more repetitions of an uplink shared channel to carry an uplink random access message, determine, from the set of multiple TTIs, one or more corresponding TTIs for the one or more repetitions, the determining based on a per-TTI evaluation of symbols available for the uplink shared channel and based on a rule that defines types of symbols to be considered in the evaluation, and receive, from the UE, the one or more repetitions on the one or more corresponding TTIs.

In some examples of the method, apparatuses, and non-transitory computer-readable medium described herein, determining the one or more corresponding TTIs may include operations, features, means, or instructions for determining that the one or more corresponding TTIs each include one or more consecutive uplink symbols that satisfy a time domain scheduling request of the grant.

In some examples of the method, apparatuses, and non-transitory computer-readable medium described herein, satisfaction of the time domain scheduling request includes a determination that the one or more consecutive uplink symbols of each of the one or more corresponding TTIs allow for the one or more repetitions to each be transmitted on a same starting symbol within a respective TTI and may have a same transmit duration.

In some examples of the method, apparatuses, and non-transitory computer-readable medium described herein, determining the one or more corresponding TTIs may include operations, features, means, or instructions for determining that the one or more corresponding TTIs each include a combination of one or more consecutive uplink symbols and one or more consecutive flexible symbols that satisfy a time domain scheduling request of the grant.

In some examples of the method, apparatuses, and non-transitory computer-readable medium described herein, satisfaction of the time domain scheduling request includes a determination that the combination of the one or more consecutive uplink symbols and the one or more consecutive flexible symbols of each of the one or more corresponding TTIs allow for the one or more repetitions to each be transmitted on a same starting symbol within a respective TTI and may have a same transmit duration.

In some examples of the method, apparatuses, and non-transitory computer-readable medium described herein, determining the one or more corresponding TTIs may include operations, features, means, or instructions for determining that the rule defines that only the uplink symbols may be to be considered in the evaluation.

In some examples of the method, apparatuses, and non-transitory computer-readable medium described herein, determining the one or more corresponding TTIs may include operations, features, means, or instructions for determining that the rule defines that both the uplink symbols and a subset of the flexible symbols may be to be considered in the evaluation, where the subset of the flexible symbols excludes flexible symbols configured as SS/PBCH block symbols.

Some examples of the method, apparatuses, and non-transitory computer-readable medium described herein may further include operations, features, means, or instructions for transmitting an indication of the rule in either a system information block or a radio resource control message, where the indication pertains to the per-TTI evaluation for all of the set of multiple TTIs.

In some examples of the method, apparatuses, and non-transitory computer-readable medium described herein, the indication may be a one-bit indication that may be indicative of whether flexible symbols may be to be considered in the evaluation.

Some examples of the method, apparatuses, and non-transitory computer-readable medium described herein may further include operations, features, means, or instructions for transmitting a bit map that indicates the rule for each special TTI of the set of multiple TTIs, the bit map transmitted in either a system information block or a radio resource control message, where the bit map may be indicative of whether flexible symbols may be to be considered in the evaluation on a per-special TTI basis, and where a special TTI includes at least one flexible symbol.

In some examples of the method, apparatuses, and non-transitory computer-readable medium described herein, periodically applying the bit map within sets of TTIs within the set of multiple TTIs.

Some examples of the method, apparatuses, and non-transitory computer-readable medium described herein may further include operations, features, means, or instructions for transmitting, to the UE, a message including capability information corresponding to a capability of the base station to simultaneously transmit and receive signaling, where determining the one or more corresponding TTIs may be based on the capability information.

In some examples of the method, apparatuses, and non-transitory computer-readable medium described herein, the grant schedules a Msg3 transmission in a four-step random access procedure, a Msg3 retransmission in the four-step random access procedure, or both.

In some examples of the method, apparatuses, and non-transitory computer-readable medium described herein, the set of multiple TTIs include a set of slots in a frame or a set of slots in a set of multiple frames.

BRIEF DESCRIPTION OF THE DRAWINGS

FIGS. 3A and 3B illustrate examples of resource diagrams that support available slots for uplink shared channel repetitions in accordance with aspects of the present disclosure.

DETAILED DESCRIPTION

In some wireless communications systems, a user equipment (UE) and a base station may perform a random access channel (RACH) procedure to initiate communications. The UE and the base station may exchange multiple messages, such as four messages in a four-step RACH procedure. The first message, Msg1, may be a RACH preamble, and is sent by the UE. Msg2 is sent from a base station and may include timing information and a scheduling grant and may be referred to as a random access response (RAR). The third message, Msg3, is sent by the UE and may include a scheduling request and may be carried in an uplink shared channel (e.g., a physical uplink shared channel (PUSCH)). A grant for an initial transmission of Msg3 may be received in the RAR. If the Msg3 is not transmitted successfully the first time, the UE may receive an additional grant to retransmit the uplink shared channel carrying the Msg3. In both the grants for initial and retransmission of Msg3, the base station may configure a number of repetitions of the Msg3 transmission. The UE may repeat the PUSCH transmission the indicated number of repetitions, selecting available slots for the repetitions. Uplink slots may be available for the repetitions, but the UE and base station may benefit from additionally or alternatively using special slots for the repetitions. Special slots include flexible symbols, which may be either uplink or downlink, as configured by the network.

As described herein, a UE and a base station may determine whether special slots may be considered as available for Msg3 repetitions based on one or more rules. In some examples, the rule may prevent the consideration of flexible symbols within a special slot. That is, a special slot may be considered as available for Msg3 repetitions if the special slot includes uplink symbols that are available (e.g., in the right time pattern) for the entirety of a given Msg3 repetition. Flexible symbols within the special slot may not be considered. In some other examples, the rule may specify both flexible symbols and uplink symbols within a special slot may be considered in determining whether the special slot may be available for Msg3 repetition. The rules may be configured via system information blocks (SIBs) for entire frames (e.g., via a one-bit indicator) or on a slot-by-slot basis (e.g., via a bitmap). The applied rules may be selected by the network based on network capability (e.g., based on if the base station is capable of full duplex communications or only half duplex communications).

Aspects of the disclosure are initially described in the context of wireless communications systems. Aspects of the disclosure are further described in the context of a resource diagrams and a process flow. Aspects of the disclosure are further illustrated by and described with reference to apparatus diagrams, system diagrams, and flowcharts that relate to available slots for uplink shared channel repetitions.

Figure 1:
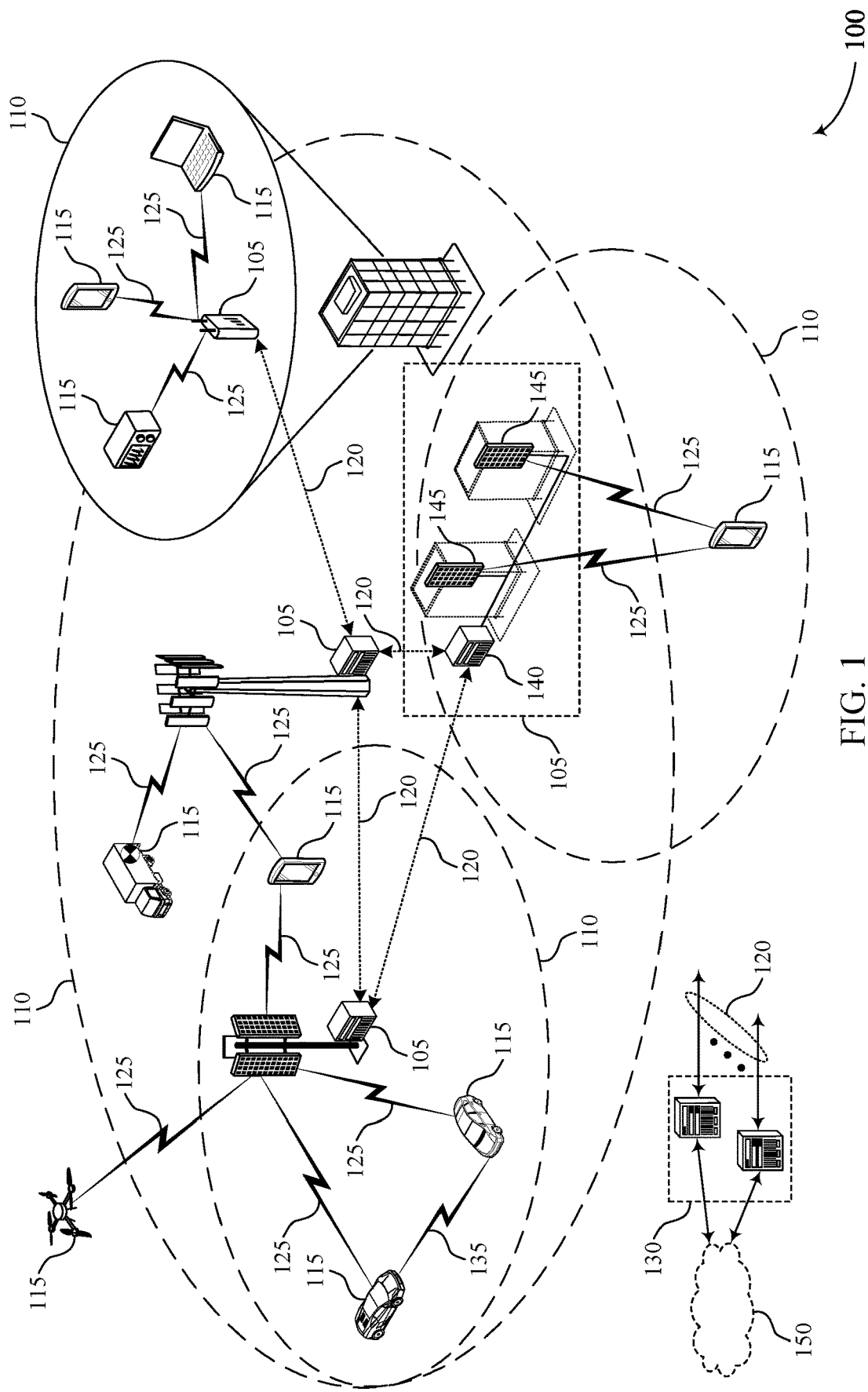
FIGS. 1 and 2 illustrate examples of wireless communications systems that support available slots for uplink shared channel repetitions in accordance with aspects of the present disclosure.

FIG. 1 illustrates an example of a wireless communications system 100 that supports available slots for uplink shared channel repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may perform a random access procedure to establish communications with a base station 105. For example, the UE 115 may initiate a RACH procedure, such as a four-step RACH procedure, by sending a Msg1 to the base station 105. In some cases, the base station 105 may detect the Msg1 and send a Msg2 of the four-step random access procedure to the UE 115. The Msg2 may include a timing advance, an uplink grant for a Msg3 from the UE 115, an RNTI, or a combination thereof. The UE 115 may transmit the Msg3 to the base station, which may include an RRC connection request, a scheduling request, a buffer status, and the like. The base station 105 may send a Msg4 of the random access procedure to the UE 115 in response to the Msg3, the Msg4 including a contention resolution message.

In some cases, the UE 115 may transmit multiple Msg3 attempts to the base station 105, which may be referred to as Msg3 repetitions. The UE 115 may repeat the PUSCH transmission in available TTIs, such as slots, according to a same symbol allocation in each TTI. In some cases, if the network configures flexible symbols in a TTI as downlink symbols, the base station 105 may not be able to receive PUSCHs transmitted in the TTI. In some cases, the UEs 115 in the idle or inactive mode may not know the direction of the flexible symbols, thus may not know whether to use the flexible symbols as available symbols for a PUSCH repetition or not.

In some examples, a UE 115 may receive signaling from the base station 105, such that the UE 115 may determine available TTIs for a PUSCH carrying an uplink random access message. For example, the UE 115 may receive control signaling including a TTI configuration and a scheduling grant for the PUSCH repetitions from a base station 105. The UE 115 may determine one or more TTIs are available for the repetitions based on a rule that defines types of symbols to be considered. For example, the rule may specify an available TTI, is a TTI that includes consecutive uplink symbols satisfying a time-domain resource allocation for a PUSCH repetition. In some other examples, the rule may specify an available TTI is a TTI that includes consecutive uplink symbols, flexible symbols, or both that satisfy the time-domain resource allocation for a PUSCH repetition.

Figure 2:
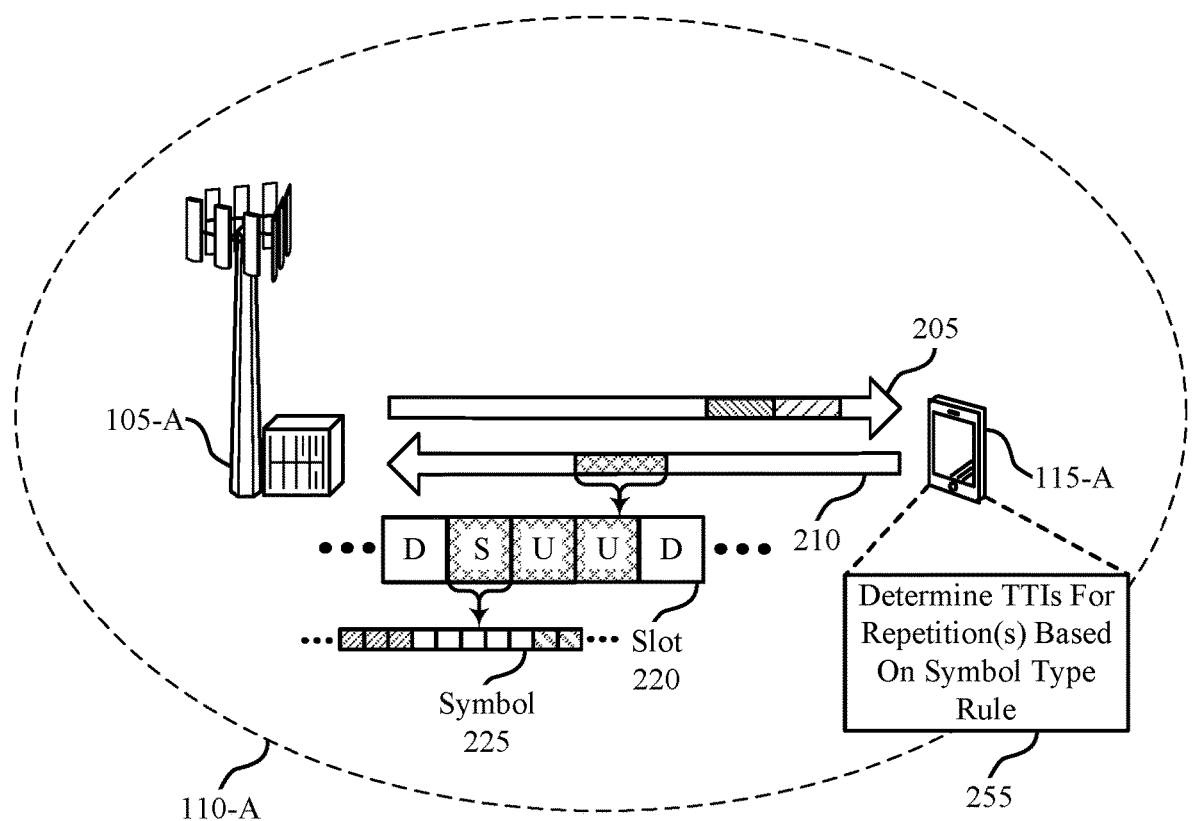

FIG. 2 illustrates an example of a wireless communications system 200 that supports available slots for uplink shared channel repetitions in accordance with aspects of the present disclosure. In some examples, wireless communications system 200 may implement aspects of wireless communication system 100 and may include a UE 115-a and a base station 105-a with a coverage area 110-a, which may be examples of a UE 115 and a base station 105 with a coverage area 110 as described with reference to FIG. 1. In some examples, base station 105-a and UE 115-a may communicate control information, data, or both using a downlink communication link 205 and an uplink communication link 210. For example, base station 105-a may transmit a configuration for one or more TTIs and a scheduling grant for one or more uplink random access message repetitions, such that UE 115-a may transmit the repetitions in one or more available symbols according to a rule.

In some examples, a UE 115 may perform a random access procedure to establish communications with a base station 105. For example, UE 115-a may receive one or more broadcast signals (e.g., a synchronization signal block (SSB), one or more SIB, or the like) from base station 105-a. In some cases, a received SIB may be a type 1 SIB (SIB1). The SIB1 may include one or more access related parameters. Based on information included in the SSB and one or more SIBs (e.g., a SIB1), the UE 115 may initiate a RACH procedure, such as a four-step RACH procedure, by sending a Msg1 to the base station 105. In some cases, the Msg1 may be a random access preamble. In some cases, base station 105-a may detect the Msg1 and send a Msg2 of the four-step random access procedure to the UE 115. For example, base station 105-a may scramble a physical downlink control channel (PDCCH) transmission (e.g., a downlink control information (DCI) message) with a random access-radio network temporary identifier (RA-RNTI). The RA-RNTI may be a function of the random access occasion used to send the Msg1. In some examples, the PDCCH transmission may point to (e.g., provide a grant for) a physical downlink shared channel (PDSCH) transmission, and the PDSCH transmission may include a medium access control-control element (MAC-CE) that acknowledges the reception of the Msg1. The PDCCH transmission, the PDSCH transmission, or both collectively may be referred to as a RAR.

The PDSCH transmission may include an uplink grant from the base station 105 for the UE 115 to send a Msg3 of the random access procedure to the base station 105. In some cases, the Msg2 may include a timing advance, an uplink grant for a Msg3 from the UE 115, a temporary cell (TC)-RNTI, or a combination thereof. The UE 115 may transmit the Msg3 to the base station, which may include an RRC connection request, a scheduling request, a buffer status, and the like. The base station 105 may send a Msg4 of the random access procedure to the UE 115 in response to the Msg3, the Msg4 including a contention resolution message.

In some cases, the UE 115 may transmit multiple Msg3 attempts to the base station 105. For example, UE 115-*a* may transmit an initial Msg3 transmission and one or more Msg3 retransmissions. Further, to transmit the Msg3, the UE 115 first successfully receives both a RAR for an initial transmission and a DCI (e.g., scrambled according to the TC-RNTI) for the retransmission of the Msg3, which may lead to relatively high signaling overhead related to receiving PDCCH transmissions. Thus, retransmission of the Msg3 may increase initial access latency for the RACH procedure. In some examples, Msg3 repetition may be enabled (e.g., by a network entity) at the UE 115 to extend Msg3 coverage. The Msg3 repetitions may be enabled for the initial Msg3 transmission and the Msg3 retransmissions.

In some examples, the Msg3 repetitions may be referred to as PUSCH repetitions 215. The UE 115 may transmit a number of PUSCH repetitions 215 according to a defined maximum number of repetitions. In some cases, the number of PUSCH repetitions 215 may be counted according to available uplink slots 220. In some examples, the PUSCH repetitions 215 may be Type A repetitions, which may refer to the repetitions being slot-based. That is, for Type A repetitions, the UE 115 may repeat the PUSCH transmission in available slots 220 applying a same symbol allocation (e.g., same starting symbol 225 and same transmission duration over consecutive symbols 225) in each slot 220.

In some cases, such as for TDD operation in unpaired spectrum, a UE 115 in an idle or inactive mode may acquire a cell-specific slot format configuration (e.g., tdd-UL-DL-ConfigurationCommon) in a SIB. The UE 115 may determine the available slots 220 for PUSCH repetitions 215 based on the slot format configuration. In some case, both uplink symbols 240 and flexible symbols 235 may be used for the determination. However, the network may reconfigure the flexible symbols 235 to downlink symbols 230 or uplink symbols 240 according to a UE-specific semi-static slot format configuration (e.g., tdd-UL-DL-Configuration-Dedicated) or according to a UE group common dynamic slot format signaling (e.g., a DCI 2_0 message) for UEs 115 in a connected mode, while the UEs 115 in the idle or inactive mode may not acquire the configuration or signaling. In some cases, if the network (e.g., via a base station 105) configures flexible symbols 235 as downlink symbols 230, the base station 105 may not be able to receive PUSCHs transmitted in the slot 220. In some cases, the UEs 115 in the idle or inactive mode may not know the direction of the flexible symbols 235, thus may not know whether to use the flexible symbols 235 as available symbols 225 for a PUSCH repetition 215 or not.

In some examples, a UE 115 may receive signaling from the base station 105, such that the UE 115 may determine available slots 220 for PUSCH repetitions 215, or Msg3 repetitions (e.g., a PUSCH carrying an uplink random access message). For example, UE 115-*a* may receive control signaling including a TTI configuration 245. In some cases, UE 115-*a* may receive a scheduling grant 250 for the PUSCH repetitions 215. The TTI configuration 245, the scheduling grant 250, or both may be a part of a RAR from base station 105-*a*.

In some cases, the TTI may include one or more slots 220, each of which may include any number of symbols 225. Each TTI may include either downlink symbols 230, flexible symbols 235, or uplink symbols 240, or a combination thereof. A flexible symbol 235 may be configurable as either an uplink symbol 240 or a downlink symbol 230. In some examples, there may be a gap (e.g., a guard period) for any transition between downlink symbols 230 and uplink symbols 240.

In some cases, at 255, UE 115-*a* may determine one or more TTIs for the repetitions based on a rule that defines types of symbols to be considered. For example, UE 115-*a* may perform a per-TTI evaluation of symbols 225 available for a PUSCH repetition 215. In some examples, the rule may specify an available TTI, or slot 220, is a TTI that includes consecutive uplink symbols 240 satisfying a time-domain resource allocation for a PUSCH repetition 215. That is, UE 115-*a* may use a TTI for the PUSCH repetition 215 if the TTI includes consecutive uplink symbols 240 in a correct location for the symbol allocation according to the Type A PUSCH repetition configuration for the PUSCH repetition 215. In some other examples, the rule may specify an available TTI is a TTI that includes consecutive uplink symbols 240, flexible symbols 235, or both (e.g., except synchronization signal (SS)/physical broadcast channel (PBCH) block symbols) that satisfy the time-domain resource allocation for a PUSCH repetition 215.

In some examples, base station 105-*a* may directly indicate the rule to UE 115-*a* (e.g., via dynamic control signaling, such as a DCI message). For example, a network or network entity, such via base station 105-*a*, may configure whether UE 115-*a* may use flexible symbols 235 for transmitting PUSCH repetitions 215 in SIB1. In some cases, base station 105-*a* may use a bit in SIB1 to indicate whether UE 115-*a* may use flexible symbols 235 for determining an available slot 220 for transmission of a PUSCH repetition 215 (e.g., where a 1 indicates UE 115-*a* may use consecutive uplink symbols 240 and 0 indicates UE 115-*a* may use either consecutive uplink symbols 240, consecutive flexible symbols 235, or both that satisfy the time-domain resource allocation). In some other cases, base station 105-*a* may use a bit map in SIB1 to indicate whether UE 115-*a* may use flexible symbols 235 in a slot 220 for PUSCH repetition transmission or not. In some examples, the bit map may indicate a portion of flexible symbols 235 in a TTI as unusable for the PUSCH repetition 215. The bit map may be defined for a number of TTIs (e.g., a duration of N slots 220), and then may be repeated every N slots 220.

In some examples, a base station 105 may indicate to a UE 115 capability information regarding full duplex operation. For example, base station 105-*a* may indicate to UE 115-*a* whether base station 105-*a* supports simultaneous reception and transmission in unpaired spectrum. Base station 105-*a* may include the capability information in system information. In some examples, UE 115-*a* may use consecutive uplink symbols 240 for the PUSCH repetitions 215 if base station 105-*a* does not support full duplex operation. In some other examples, UE 115-*a* may use consecutive uplink symbols 240, consecutive flexible symbols 235, or both if base station 105-*a* does support full duplex operation.

FIGS. 3A and 3B illustrate examples of resource diagrams 300 that support available slots for uplink shared channel repetitions in accordance with aspects of the present disclosure. In some examples, resource diagram 300-*a* and resource diagram 300-*b* may implement aspects of wireless communication system 100 and wireless communications system 200. For example, resource diagram 300-*a* and resource diagram 300-*b* may be implemented by a UE 115 and a base station 105 as described with reference to FIGS. 1 and 2. In some cases, a base station may transmit control signaling to a UE including a TTI configuration and a grants scheduling PUSCH repetitions 305 for an uplink control message (e.g., Msg3). In some examples, as illustrated in FIG. 3A, the UE may determine to use consecutive uplink symbols for the PUSCH repetitions 405. In some other examples, as illustrated in FIG. 3B, the UE may determine to use consecutive uplink symbols, consecutive flexible symbols, or both for the PUSCH repetitions 405.

In some cases, a UE may be configured (e.g., by a network or network entity) to perform one or more repetitions of an uplink channel, such as PUSCH repetitions 305. The PUSCH repetitions 305 may carry an uplink random access message, such as a Msg3 in a four-step random access procedure. In some examples, the UE may determine which TTIs are available for the PUSCH repetitions 305 according to a symbol type rule. For example, the UE may transmit the PUSCH repetitions 305 during one or more slots 310. Each slot 310 may include one or more symbols 315.

Each TTI, or slot 310, may support a transmission direction according to a TTI configuration, which the UE may receive from a base station. For example, each TTI may include uplink symbols, which may mean the slot is an uplink slot (e.g., denoted by a 'U'), downlink symbols, which may mean the slot is a downlink slot (e.g., denoted by a 'D'), or both uplink and downlink symbols, which may mean the slot is a special slot (e.g., denoted by an 'S'). In some cases, if the TTI is a special TTI, the TTI may include downlink symbols (e.g., denoted by 'D'), flexible symbols (e.g., denoted by 'F'), which may support transmission in either the uplink or downlink direction, uplink symbols (e.g., denoted by 'U'), or a combination thereof. In some examples, a special TTI may also include one or more gaps, which may be referred to as guard periods, between a downlink direction transmission and an uplink direction transmission.

In some cases, the UE may determine which TTIs, or slots 310, are available for the PUSCH repetitions 305 according to a rule, which may be indicated to the UE by a base station as described with reference to FIG. 2. For example, as illustrated in FIG. 3A, the UE may determine one or more TTIs are available based on the TTI including consecutive uplink symbols that satisfy a time-domain resource allocation 320-a for a PUSCH repetition 305. That is, the UE may not use a special TTI that includes flexible symbols to transmit the PUSCH repetition 305.

In some other cases, as illustrated in FIG. 3B, the UE may determine one or more TTIs are available based on the TTI including consecutive uplink symbols, flexible symbols, or both satisfying time-domain resource allocation 320-b for a PUSCH repetition 305. The flexible symbols or uplink symbols may not be SS/PBCH block symbols. Thus, the UE may use uplink symbols for transmitting the PUSCH repetition 305 and flexible symbols that are not SS/PBCH block symbols for the PUSCH repetition 305.

Figure 4:
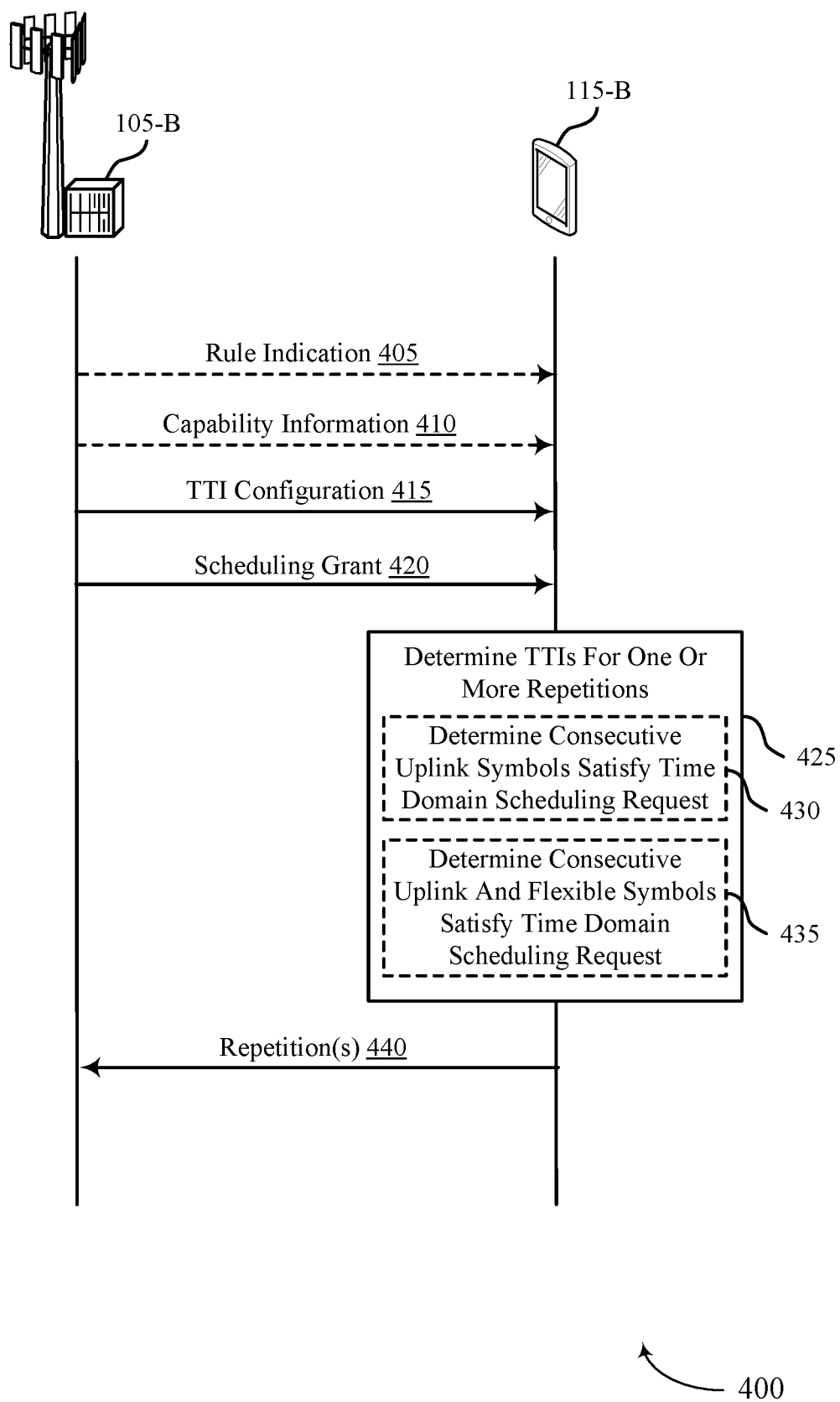
FIG. 4 illustrates an example of a process flow that supports available slots for uplink shared channel repetitions in accordance with aspects of the present disclosure.

FIG. 4 illustrates an example of a process flow 400 that supports available slots for uplink shared channel repetitions in accordance with aspects of the present disclosure. In some examples, process flow 400 may implement aspects of wireless communications system 100, wireless communication system 200, and resource diagrams 300. The process flow 400 may illustrate an example of a base station 105-b transmitting a TTI configuration and grant to a UE 115-a that allows UE 115-a to determine an available TTI for one or more PUSCH repetitions of random access uplink message. Alternative examples of the following may be implemented, where some processes are performed in a different order than described or are not performed. In some cases, processes may include additional features not mentioned below, or further processes may be added.

At 405, UE 115-b may receive an indication of a rule that defines types of symbols to be considered in an evaluation for determining available TTIs for one or more uplink shared channel repetitions, such as PUSCH repetitions. UE 115-b may receive the indication of the rule in either a SIB (e.g., SIB1) or in an RRC message. The indication may be related to a per-TTI evaluation for multiple TTIs. In some cases, the indication may be a one-bit indication that is indicative of whether flexible symbols are to be considered in the evaluation. In some other cases, UE 115-b may receive a bit map that indicates the rule for each special TTI. UE 115-b may receive the bit map in either a SIB or an RRC message. The bit map may be indicative of whether flexible symbols are to be considered in the evaluation on a per-special TTI basis. In some examples, a special TTI includes at least one flexible symbol. In some cases, UE 115-b may periodically apply the bit map within sets of TTIs (e.g., according to a periodicity).

At 410, UE 115-b may receive a message from base station 105-b including capability information. The capability information may indicate a capability of base station 105-b to support full duplex communication. That is, the capability information may indicate to UE 115-b whether base station 105-b may simultaneously transmit and receive signaling.

At 415, UE 115-b may receive a configuration for multiple TTIs from base station 105-b. Each TTI may include either uplink symbols, downlink symbols, flexible symbols, or combinations thereof. A flexible symbol may be configurable as either an uplink symbol or a downlink symbol. In some cases, the TTIs include a set of slots in a frame or a set of slots in multiple frames.

At 420, UE 115-b may receive a grant from base station 105-b, the grant scheduling one or more repetitions of an uplink shared channel to carry an uplink random access message (e.g., a Msg3). The grant may schedule a Msg3 transmission in a four-step random access procedure, a Msg3 retransmission in the four-step random access procedure, or both At 425, UE 115-b may determine one or more TTIs for the one or more repetitions. UE 115-b may determine the TTIs based on a per-TTI evaluation of symbols available for the uplink shared channel and based on a rule (e.g., the rule received at 405). In some examples, UE 115-b may determine the TTIs based on the capability information from base station 105-b (e.g., may select uplink symbols if base station 105-b does not support full duplex or uplink symbols and flexible symbols if base station 105-b does support full duplex). In some cases, UE 115-b may determine that the rule defines that uplink symbols may be considered in the evaluation. In some other cases, UE 115-b may determine that the rule defines that both the uplink symbols and a subset of the flexible symbols may be considered in the evaluation, where the subset of the flexible symbols excludes flexible symbols configured as SS/PBCH block symbols.

At 430, UE 115-b may determine that the TTIs each include one or more consecutive uplink symbols that satisfy a time domain scheduling request of the grant. In some cases, satisfaction of the time domain scheduling request includes a determination that the one or more consecutive uplink symbols of each of the TTIs allow for the one or more repetitions to each be transmitted on a same starting symbol within a respective TTI and have a same transmit duration.

At 435, UE 115-b may determine that the TTIs each include a combination of one or more consecutive uplink symbols and one or more consecutive flexible symbols that satisfy a time domain scheduling request of the grant. In some cases, satisfaction of the time domain scheduling request includes a determination that the combination of the one or more consecutive uplink symbols and the one or more consecutive flexible symbols of each of the TTIs allow for the one or more repetitions to each be transmitted on a same starting symbol within a respective TTI and have a same transmit duration.

At 440, UE 115-*b* may transmit the one or more repetitions on the one or more corresponding TTIs to base station 105-*b*.

Figure 5:
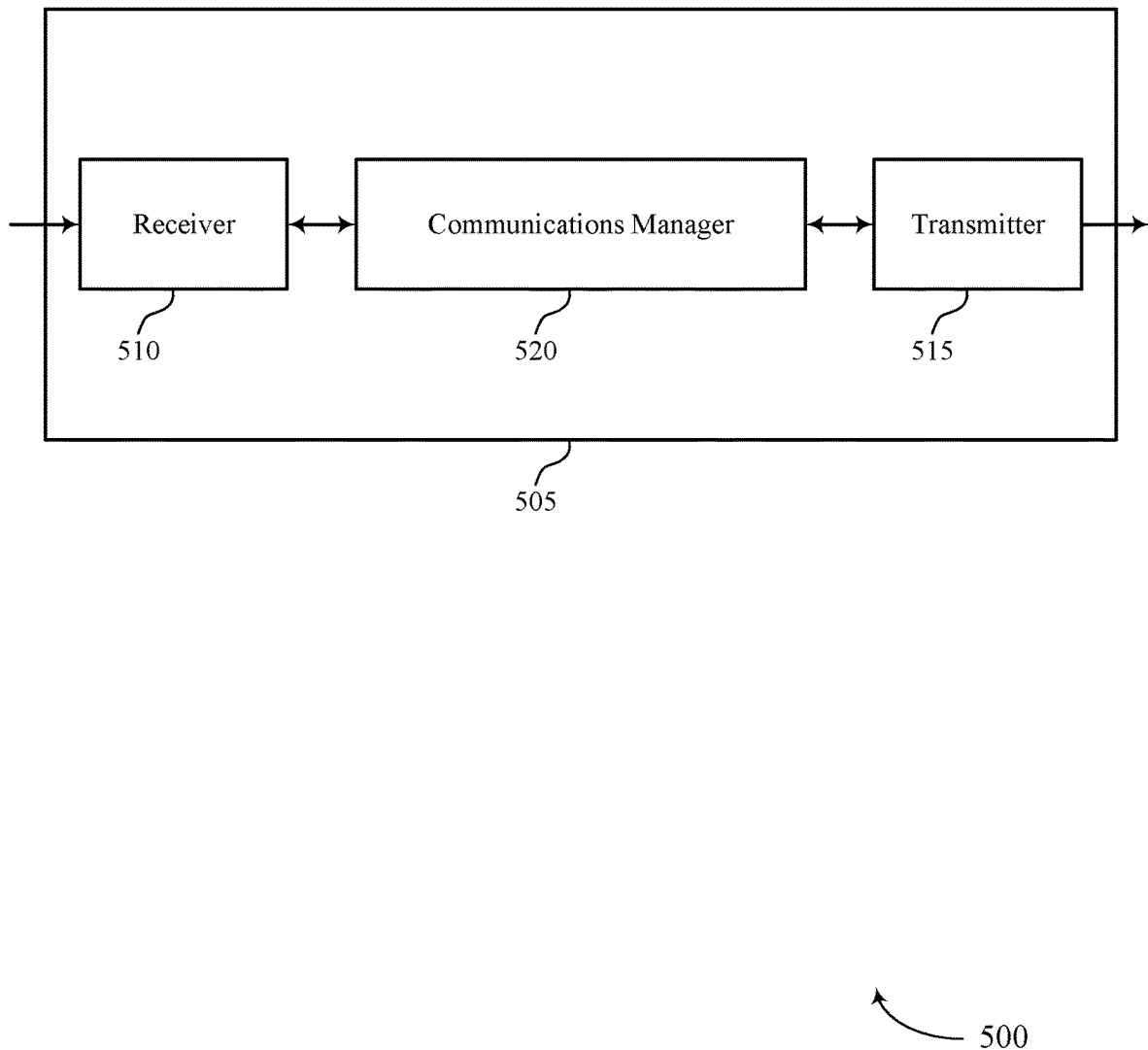
FIGS. 5 and 6 show block diagrams of devices that support available slots for uplink shared channel repetitions in accordance with aspects of the present disclosure.

FIG. 5 shows a block diagram 500 of a device 505 that supports available slots for uplink shared channel repetitions in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to available slots for uplink shared channel repetitions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to available slots for uplink shared channel repetitions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of available slots for uplink shared channel repetitions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, a configuration for a set of multiple transmission time intervals that each include either uplink symbols, downlink symbols, flexible symbols, or combinations thereof, where a flexible symbol is configurable as either an uplink symbol or a downlink symbol. The communications manager 520 may be configured as or otherwise support a means for receiving a grant from the base station, the grant scheduling one or more repetitions of an uplink shared channel to carry an uplink random access message. The communications manager 520 may be configured as or otherwise support a means for determining, from the set of multiple transmission time intervals, one or more corresponding transmission time intervals for the one or more repetitions, the determining based on a per-transmission time interval evaluation of symbols available for the uplink shared channel and based on a rule that defines types of symbols to be considered in the evaluation. The communications manager 520 may be configured as or otherwise support a means for transmitting, to the base station, the one or more repetitions on the one or more corresponding transmission time intervals.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a base station may transmit a TTI configuration and grant to a UE that allows the UE to determine an available TTI for one or more PUSCH repetitions of random access uplink message, which may cause reduced processing, reduced power consumption, more efficient utilization of communication resources, and the like.

Figure 6:
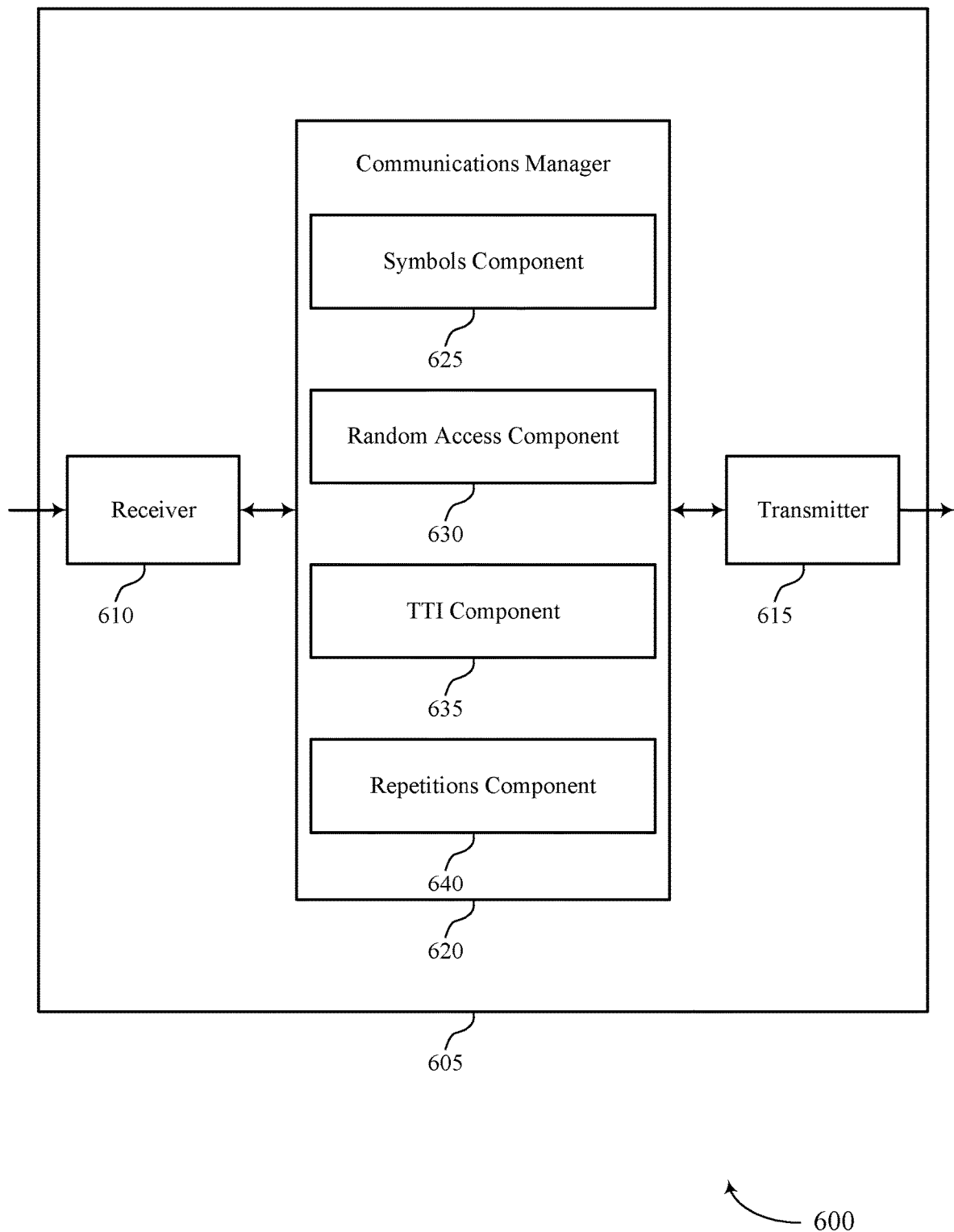

FIG. 6 shows a block diagram 600 of a device 605 that supports available slots for uplink shared channel repetitions in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to available slots for uplink shared channel repetitions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to available slots for uplink shared channel repetitions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of available slots for uplink shared channel repetitions as described herein. For example, the communications manager 620 may include a symbols component 625, a random access component 630, a TTI component 635, a repetitions component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The symbols component 625 may be configured as or otherwise support a means for receiving, from a base station, a configuration for a set of multiple transmission time intervals that each include either uplink symbols, downlink symbols, flexible symbols, or combinations thereof, where a flexible symbol is configurable as either an uplink symbol or a downlink symbol. The random access component 630 may be configured as or otherwise support a means for receiving a grant from the base station, the grant scheduling one or more repetitions of an uplink shared channel to carry an uplink random access message. The TTI component 635 may be configured as or otherwise support a means for determining, from the set of multiple transmission time intervals, one or more corresponding transmission time intervals for the one or more repetitions, the determining based on a per-transmission time interval evaluation of symbols available for the uplink shared channel and based on a rule that defines types of symbols to be considered in the evaluation. The repetitions component 640 may be configured as or otherwise support a means for transmitting, to the base station, the one or more repetitions on the one or more corresponding transmission time intervals.

Figure 7:
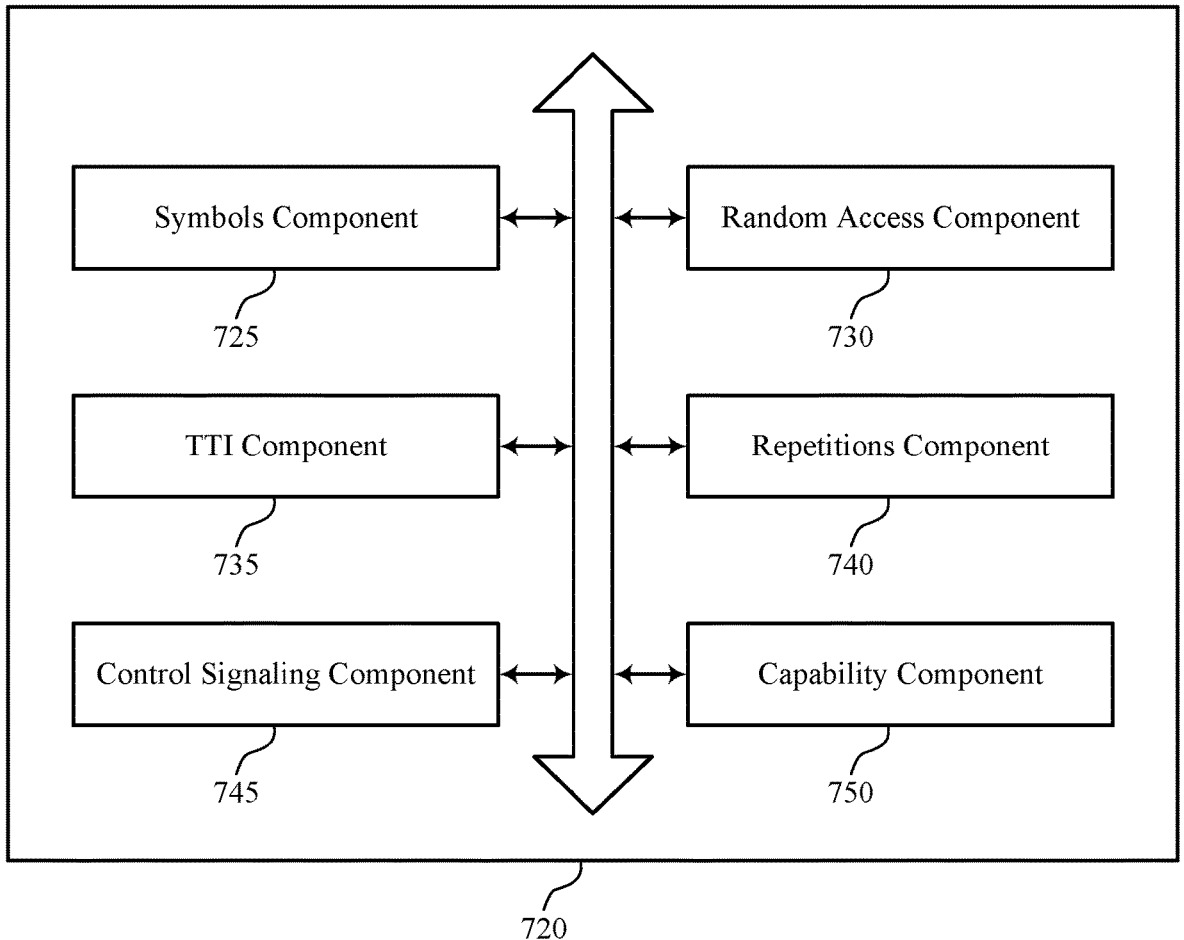
FIG. 7 shows a block diagram of a communications manager that supports available slots for uplink shared channel repetitions in accordance with aspects of the present disclosure.

FIG. 7 shows a block diagram 700 of a communications manager 720 that supports available slots for uplink shared channel repetitions in accordance with aspects of the present disclosure. The communications manager 720 may be an example of aspects of a communications manager 520, a communications manager 620, or both, as described herein. The communications manager 720, or various components thereof, may be an example of means for performing various aspects of available slots for uplink shared channel repetitions as described herein. For example, the communications manager 720 may include a symbols component 725, a random access component 730, a TTI component 735, a repetitions component 740, a control signaling component 745, a capability component 750, or any combination thereof. Each of these components may communicate, directly or indirectly, with one another (e.g., via one or more buses).

The communications manager 720 may support wireless communications at a UE in accordance with examples as disclosed herein. The symbols component 725 may be configured as or otherwise support a means for receiving, from a base station, a configuration for a set of multiple transmission time intervals that each include either uplink symbols, downlink symbols, flexible symbols, or combinations thereof, where a flexible symbol is configurable as either an uplink symbol or a downlink symbol. The random access component 730 may be configured as or otherwise support a means for receiving a grant from the base station, the grant scheduling one or more repetitions of an uplink shared channel to carry an uplink random access message. The TTI component 735 may be configured as or otherwise support a means for determining, from the set of multiple transmission time intervals, one or more corresponding transmission time intervals for the one or more repetitions, the determining based on a per-transmission time interval evaluation of symbols available for the uplink shared channel and based on a rule that defines types of symbols to be considered in the evaluation. The repetitions component 740 may be configured as or otherwise support a means for transmitting, to the base station, the one or more repetitions on the one or more corresponding transmission time intervals.

In some examples, to support determining the one or more corresponding transmission time intervals, the TTI component 735 may be configured as or otherwise support a means for determining that the one or more corresponding transmission time intervals each include one or more consecutive uplink symbols that satisfy a time domain scheduling request of the grant.

In some examples, satisfaction of the time domain scheduling request includes a determination that the one or more consecutive uplink symbols of each of the one or more corresponding transmission time intervals allow for the one or more repetitions to each be transmitted on a same starting symbol within a respective transmission time interval and have a same transmit duration.

In some examples, to support determining the one or more corresponding transmission time intervals, the TTI component 735 may be configured as or otherwise support a means for determining that the one or more corresponding transmission time intervals each include a combination of one or more consecutive uplink symbols and one or more consecutive flexible symbols that satisfy a time domain scheduling request of the grant.

In some examples, satisfaction of the time domain scheduling request includes a determination that the combination of the one or more consecutive uplink symbols and the one or more consecutive flexible symbols of each of the one or more corresponding transmission time intervals allow for the one or more repetitions to each be transmitted on a same starting symbol within a respective transmission time interval and have a same transmit duration.

In some examples, to support determining the one or more corresponding transmission time intervals, the symbols component 725 may be configured as or otherwise support a means for determining that the rule defines that only the uplink symbols are to be considered in the evaluation.

In some examples, to support determining the one or more corresponding transmission time intervals, the symbols component 725 may be configured as or otherwise support a means for determining that the rule defines that both the uplink symbols and a subset of the flexible symbols are to be considered in the evaluation, where the subset of the flexible symbols excludes flexible symbols configured as synchronization signal/physical broadcast channel (SS/PBCH) block symbols.

In some examples, the control signaling component 745 may be configured as or otherwise support a means for receiving an indication of the rule in either a system information block or an RRC message, where the indication pertains to the per-transmission time interval evaluation for all of the set of multiple transmission time intervals.

In some examples, the indication is a one-bit indication that is indicative of whether flexible symbols are to be considered in the evaluation.

In some examples, the control signaling component 745 may be configured as or otherwise support a means for receiving a bit map that indicates the rule for each special transmission time interval of the set of multiple transmission time intervals, the bit map received in either a system information block or an RRC message, where the bit map is indicative of whether flexible symbols are to be considered in the evaluation on a per-special transmission time interval basis, and where a special transmission time interval includes at least one flexible symbol.

In some examples, the TTI component 735 may be configured as or otherwise support a means for periodically applying the bit map within sets of transmission time intervals within the set of multiple transmission time intervals.

In some examples, the capability component 750 may be configured as or otherwise support a means for receiving, from the base station, a message including capability information corresponding to a capability of the base station to simultaneously transmit and receive signaling, where determining the one or more corresponding transmission time intervals is based on the capability information.

In some examples, the grant schedules a Msg3 transmission in a four-step random access procedure, a Msg3 retransmission in the four-step random access procedure, or both.

In some examples, the set of multiple transmission time intervals include a set of slots in a frame or a set of slots in a set of multiple frames.

Figure 8:
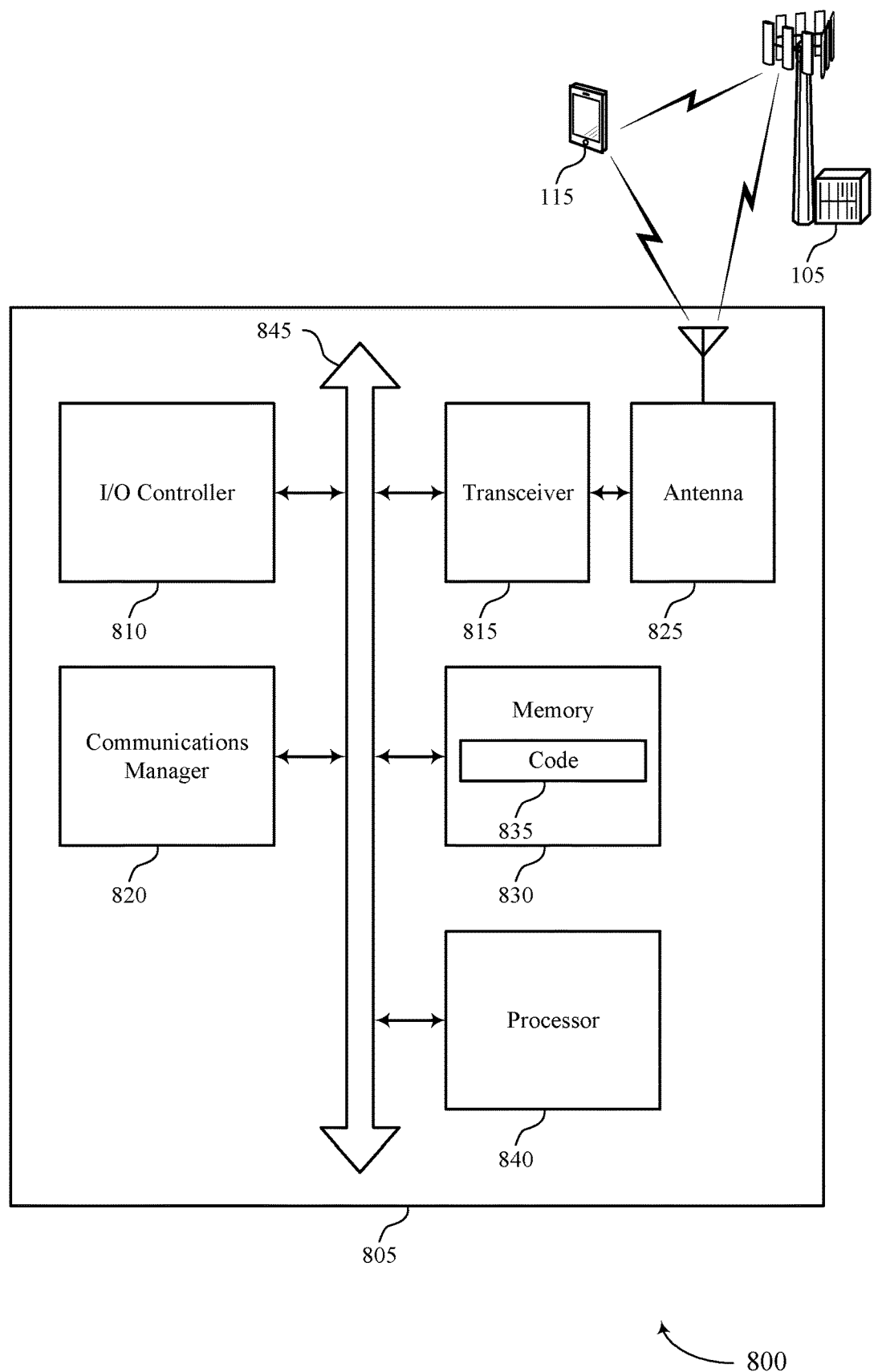
FIG. 8 shows a diagram of a system including a device that supports available slots for uplink shared channel repetitions in accordance with aspects of the present disclosure.

FIG. 8 shows a diagram of a system 800 including a device 805 that supports available slots for uplink shared channel repetitions in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting available slots for uplink shared channel repetitions). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, a configuration for a set of multiple transmission time intervals that each include either uplink symbols, downlink symbols, flexible symbols, or combinations thereof, where a flexible symbol is configurable as either an uplink symbol or a downlink symbol. The communications manager 820 may be configured as or otherwise support a means for receiving a grant from the base station, the grant scheduling one or more repetitions of an uplink shared channel to carry an uplink random access message. The communications manager 820 may be configured as or otherwise support a means for determining, from the set of multiple transmission time intervals, one or more corresponding transmission time intervals for the one or more repetitions, the determining based on a per-transmission time interval evaluation of symbols available for the uplink shared channel and based on a rule that defines types of symbols to be considered in the evaluation. The communications manager 820 may be configured as or otherwise support a means for transmitting, to the base station, the one or more repetitions on the one or more corresponding transmission time intervals.

By including or configuring the communications manager 820 in accordance with examples as described herein, the device 805 may support techniques for a base station may transmit a TTI configuration and grant to a UE that allows the UE to determine an available TTI for one or more PUSCH repetitions of random access uplink message, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of available slots for uplink shared channel repetitions as described herein, or the processor 840 and the memory 830 may be otherwise configured to perform or support such operations.

Figure 9:
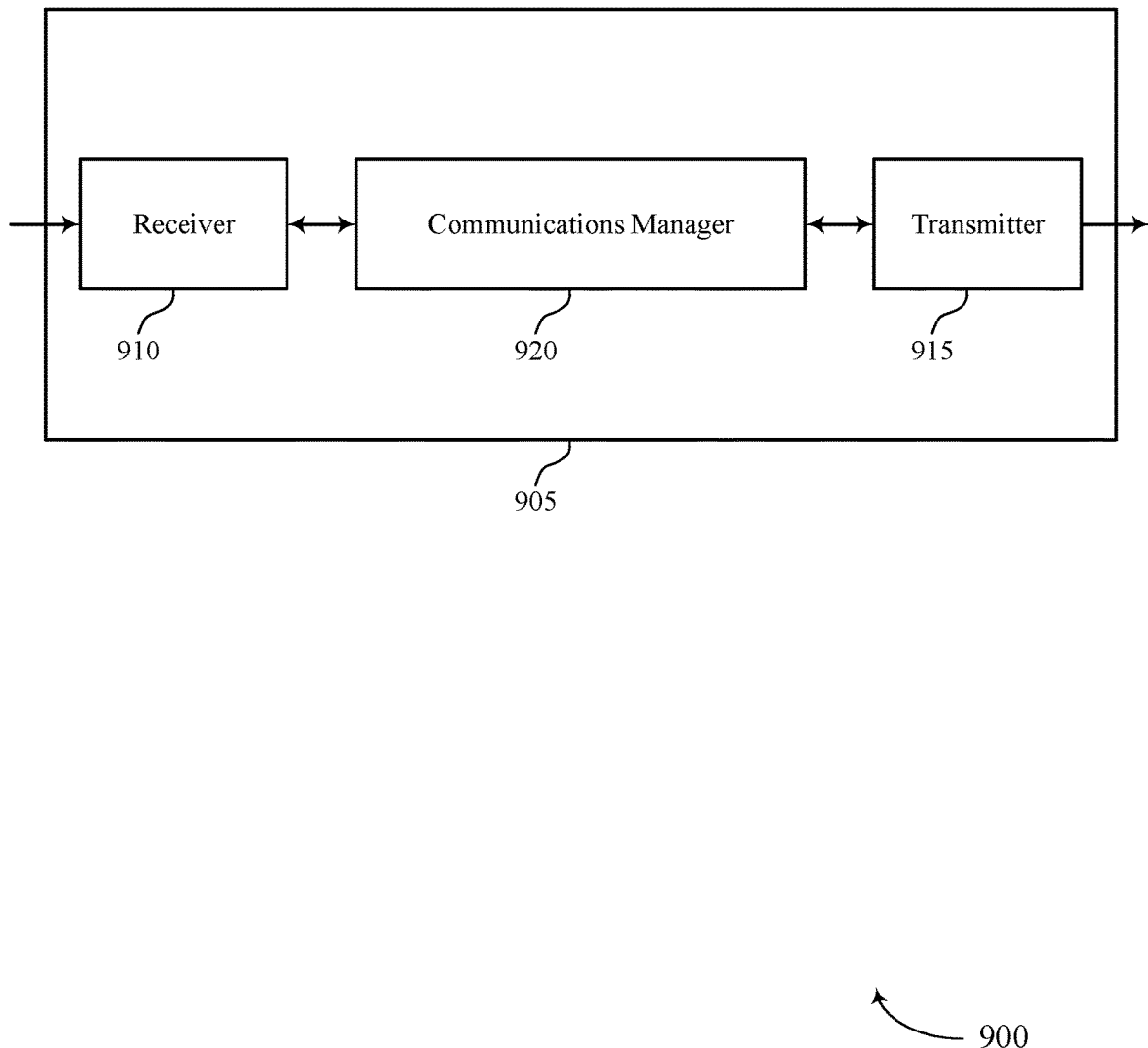
FIGS. 9 and 10 show block diagrams of devices that support available slots for uplink shared channel repetitions in accordance with aspects of the present disclosure.

FIG. 9 shows a block diagram 900 of a device 905 that supports available slots for uplink shared channel repetitions in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to available slots for uplink shared channel repetitions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to available slots for uplink shared channel repetitions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of available slots for uplink shared channel repetitions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, a configuration for a set of multiple transmission time intervals that each include either uplink symbols, downlink symbols, flexible symbols, or combinations thereof, where a flexible symbol is configurable as either an uplink symbol or a downlink symbol. The communications manager 920 may be configured as or otherwise support a means for transmitting a grant to the UE, the grant scheduling one or more repetitions of an uplink shared channel to carry an uplink random access message. The communications manager 920 may be configured as or otherwise support a means for determining, from the set of multiple transmission time intervals, one or more corresponding transmission time intervals for the one or more repetitions, the determining based on a per-transmission time interval evaluation of symbols available for the uplink shared channel and based on a rule that defines types of symbols to be considered in the evaluation. The communications manager 920 may be configured as or otherwise support a means for receiving, from the UE, the one or more repetitions on the one or more corresponding transmission time intervals.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for a base station may transmit a TTI configuration and grant to a UE that allows the UE to determine an available TTI for one or more PUSCH repetitions of random access uplink message, which may cause reduced processing, reduced power consumption, more efficient utilization of communication resources, and the like.

Figure 10:
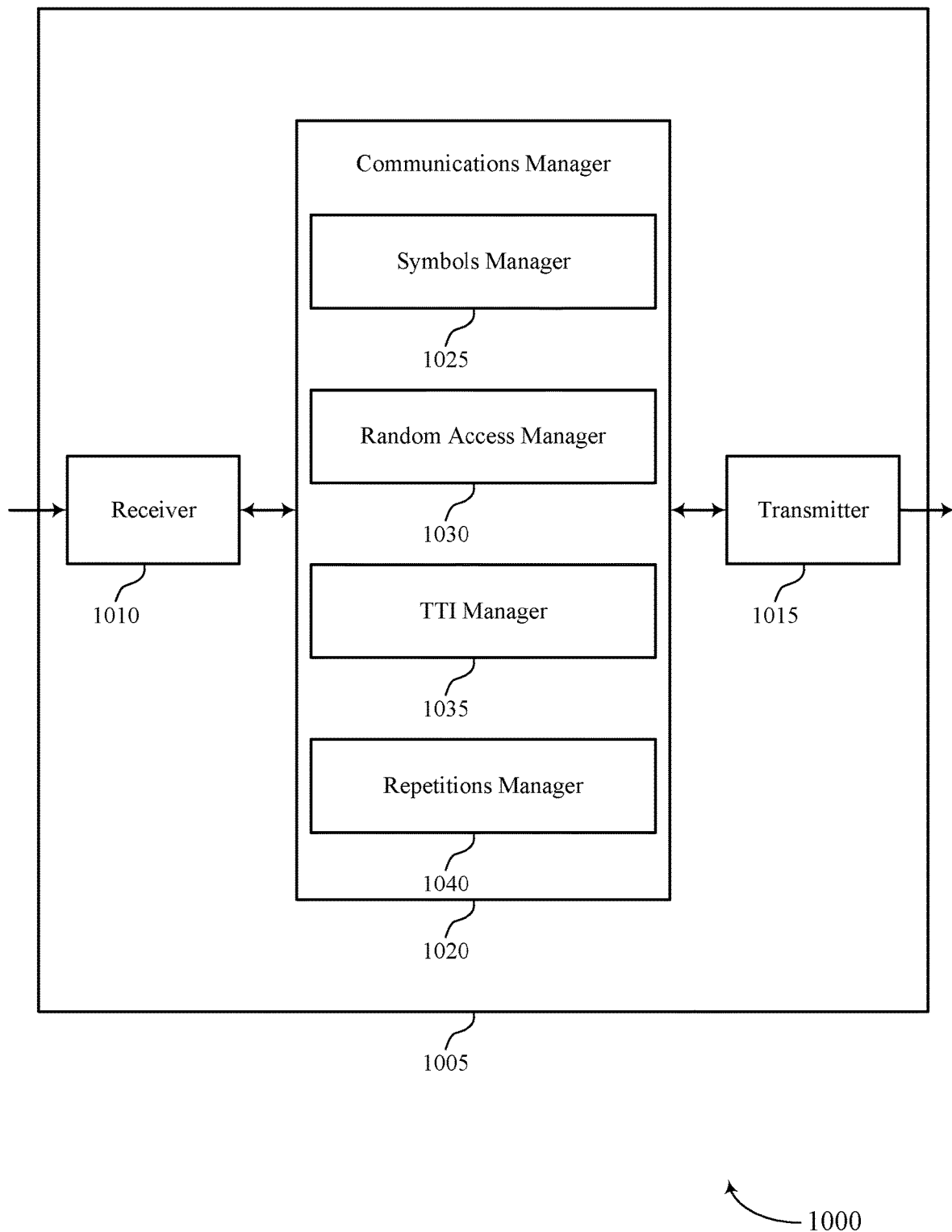

FIG. 10 shows a block diagram 1000 of a device 1005 that supports available slots for uplink shared channel repetitions in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to available slots for uplink shared channel repetitions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to available slots for uplink shared channel repetitions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of available slots for uplink shared channel repetitions as described herein. For example, the communications manager 1020 may include a symbols manager 1025, a random access manager 1030, a TTI manager 1035, a repetitions manager 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The symbols manager 1025 may be configured as or otherwise support a means for transmitting, to a UE, a configuration for a set of multiple transmission time intervals that each include either uplink symbols, downlink symbols, flexible symbols, or combinations thereof, where a flexible symbol is configurable as either an uplink symbol or a downlink symbol. The random access manager 1030 may be configured as or otherwise support a means for transmitting a grant to the UE, the grant scheduling one or more repetitions of an uplink shared channel to carry an uplink random access message. The TTI manager 1035 may be configured as or otherwise support a means for determining, from the set of multiple transmission time intervals, one or more corresponding transmission time intervals for the one or more repetitions, the determining based on a per-transmission time interval evaluation of symbols available for the uplink shared channel and based on a rule that defines types of symbols to be considered in the evaluation. The repetitions manager 1040 may be configured as or otherwise support a means for receiving, from the UE, the one or more repetitions on the one or more corresponding transmission time intervals.

Figure 11:
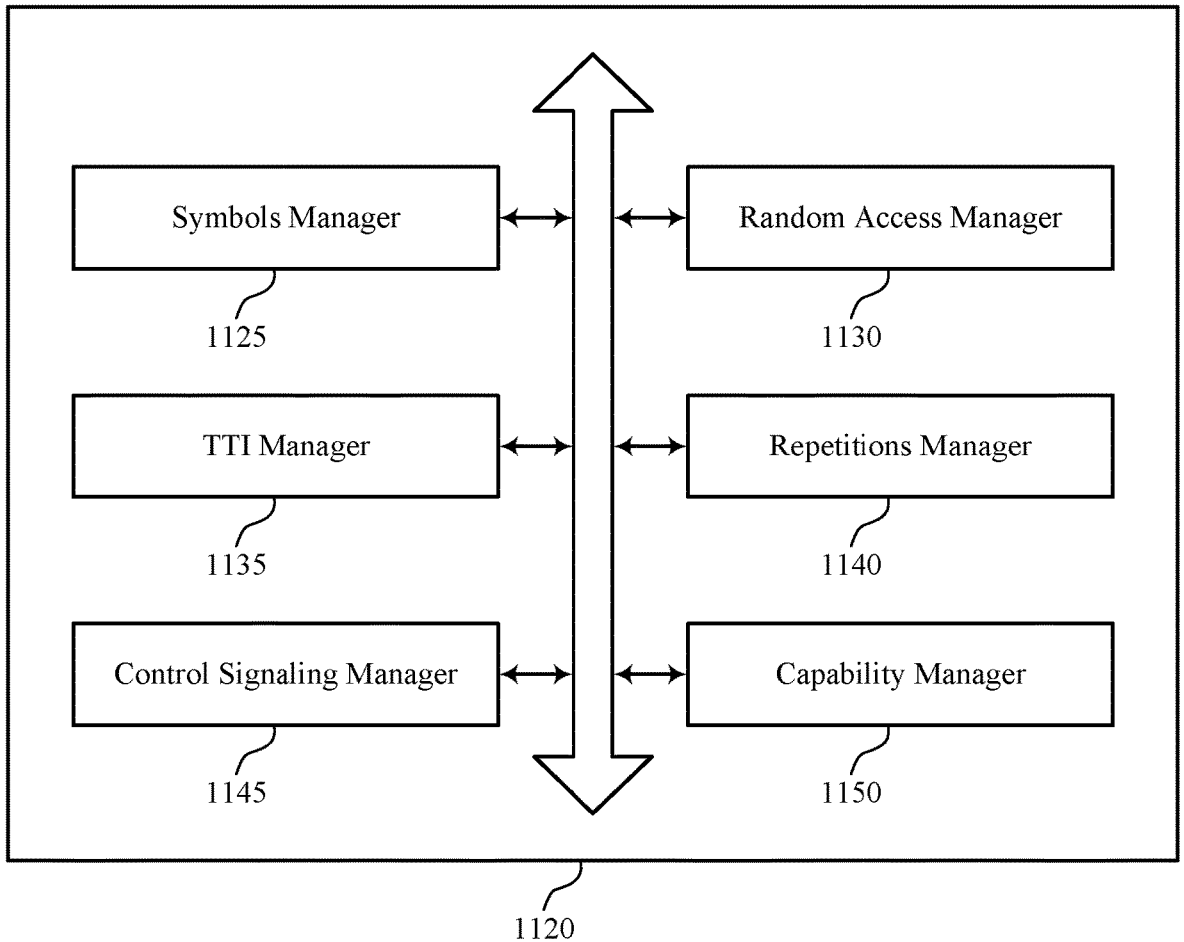
FIG. 11 shows a block diagram of a communications manager that supports available slots for uplink shared channel repetitions in accordance with aspects of the present disclosure.

FIG. 11 shows a block diagram 1100 of a communications manager 1120 that supports available slots for uplink shared channel repetitions in accordance with aspects of the present disclosure. The communications manager 1120 may be an example of aspects of a communications manager 920, a communications manager 1020, or both, as described herein. The communications manager 1120, or various components thereof, may be an example of means for performing various aspects of available slots for uplink shared channel repetitions as described herein. For example, the communications manager 1120 may include a symbols manager 1125, a random access manager 1130, a TTI manager 1135, a repetitions manager 1140, a control signaling manager 1145, a capability manager 1150, or any combination thereof. Each of these components may communicate, directly or indirectly, with one another (e.g., via one or more buses).

The communications manager 1120 may support wireless communications at a base station in accordance with examples as disclosed herein. The symbols manager 1125 may be configured as or otherwise support a means for transmitting, to a UE, a configuration for a set of multiple transmission time intervals that each include either uplink symbols, downlink symbols, flexible symbols, or combinations thereof, where a flexible symbol is configurable as either an uplink symbol or a downlink symbol. The random access manager 1130 may be configured as or otherwise support a means for transmitting a grant to the UE, the grant scheduling one or more repetitions of an uplink shared channel to carry an uplink random access message. The TTI manager 1135 may be configured as or otherwise support a means for determining, from the set of multiple transmission time intervals, one or more corresponding transmission time intervals for the one or more repetitions, the determining based on a per-transmission time interval evaluation of symbols available for the uplink shared channel and based on a rule that defines types of symbols to be considered in the evaluation. The repetitions manager 1140 may be configured as or otherwise support a means for receiving, from the UE, the one or more repetitions on the one or more corresponding transmission time intervals.

In some examples, to support determining the one or more corresponding transmission time intervals, the TTI manager 1135 may be configured as or otherwise support a means for determining that the one or more corresponding transmission time intervals each include one or more consecutive uplink symbols that satisfy a time domain scheduling request of the grant.

In some examples, satisfaction of the time domain scheduling request includes a determination that the one or more consecutive uplink symbols of each of the one or more corresponding transmission time intervals allow for the one or more repetitions to each be transmitted on a same starting symbol within a respective transmission time interval and have a same transmit duration.

In some examples, to support determining the one or more corresponding transmission time intervals, the TTI manager 1135 may be configured as or otherwise support a means for determining that the one or more corresponding transmission time intervals each include a combination of one or more consecutive uplink symbols and one or more consecutive flexible symbols that satisfy a time domain scheduling request of the grant.

In some examples, satisfaction of the time domain scheduling request includes a determination that the combination of the one or more consecutive uplink symbols and the one or more consecutive flexible symbols of each of the one or more corresponding transmission time intervals allow for the one or more repetitions to each be transmitted on a same starting symbol within a respective transmission time interval and have a same transmit duration.

In some examples, to support determining the one or more corresponding transmission time intervals, the symbols manager 1125 may be configured as or otherwise support a means for determining that the rule defines that only the uplink symbols are to be considered in the evaluation.

In some examples, to support determining the one or more corresponding transmission time intervals, the symbols manager 1125 may be configured as or otherwise support a means for determining that the rule defines that both the uplink symbols and a subset of the flexible symbols are to be considered in the evaluation, where the subset of the flexible symbols excludes flexible symbols configured as synchronization signal/physical broadcast channel (SS/PBCH) block symbols.

In some examples, the control signaling manager 1145 may be configured as or otherwise support a means for transmitting an indication of the rule in either a system information block or an RRC message, where the indication pertains to the per-transmission time interval evaluation for all of the set of multiple transmission time intervals.

In some examples, the indication is a one-bit indication that is indicative of whether flexible symbols are to be considered in the evaluation.

In some examples, the control signaling manager 1145 may be configured as or otherwise support a means for transmitting a bit map that indicates the rule for each special transmission time interval of the set of multiple transmission time intervals, the bit map transmitted in either a system information block or an RRC message, where the bit map is indicative of whether flexible symbols are to be considered in the evaluation on a per-special transmission time interval basis, and where a special transmission time interval includes at least one flexible symbol.

In some examples, the control signaling manager 1145 may be configured as or otherwise support a means for periodically applying the bit map within sets of transmission time intervals within the set of multiple transmission time intervals.

In some examples, the capability manager 1150 may be configured as or otherwise support a means for transmitting, to the UE, a message including capability information corresponding to a capability of the base station to simultaneously transmit and receive signaling, where determining the one or more corresponding transmission time intervals is based on the capability information.

In some examples, the grant schedules a Msg3 transmission in a four-step random access procedure, a Msg3 retransmission in the four-step random access procedure, or both.

In some examples, the set of multiple transmission time intervals include a set of slots in a frame or a set of slots in a set of multiple frames.

Figure 12:
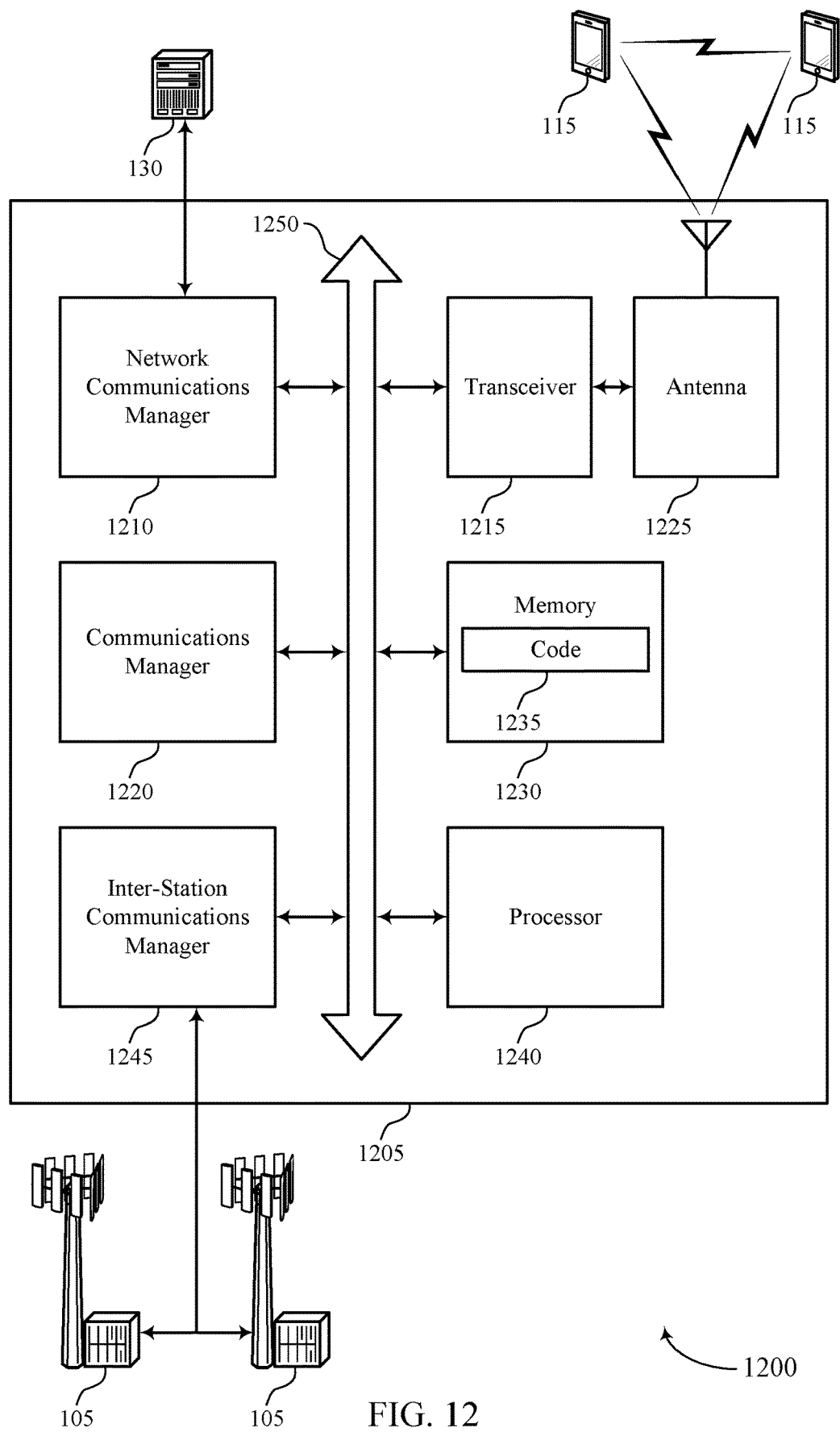
FIG. 12 shows a diagram of a system including a device that supports available slots for uplink shared channel repetitions in accordance with aspects of the present disclosure.

FIG. 12 shows a diagram of a system 1200 including a device 1205 that supports available slots for uplink shared channel repetitions in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting available slots for uplink shared channel repetitions). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, a configuration for a set of multiple transmission time intervals that each include either uplink symbols, downlink symbols, flexible symbols, or combinations thereof, where a flexible symbol is configurable as either an uplink symbol or a downlink symbol. The communications manager 1220 may be configured as or otherwise support a means for transmitting a grant to the UE, the grant scheduling one or more repetitions of an uplink shared channel to carry an uplink random access message. The communications manager 1220 may be configured as or otherwise support a means for determining, from the set of multiple transmission time intervals, one or more corresponding transmission time intervals for the one or more repetitions, the determining based on a per-transmission time interval evaluation of symbols available for the uplink shared channel and based on a rule that defines types of symbols to be considered in the evaluation. The communications manager 1220 may be configured as or otherwise support a means for receiving, from the UE, the one or more repetitions on the one or more corresponding transmission time intervals.

By including or configuring the communications manager 1220 in accordance with examples as described herein, the device 1205 may support techniques for a base station may transmit a TTI configuration and grant to a UE that allows the UE to determine an available TTI for one or more PUSCH repetitions of random access uplink message, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of available slots for uplink shared channel repetitions as described herein, or the processor 1240 and the memory 1230 may be otherwise configured to perform or support such operations.

Figure 13:
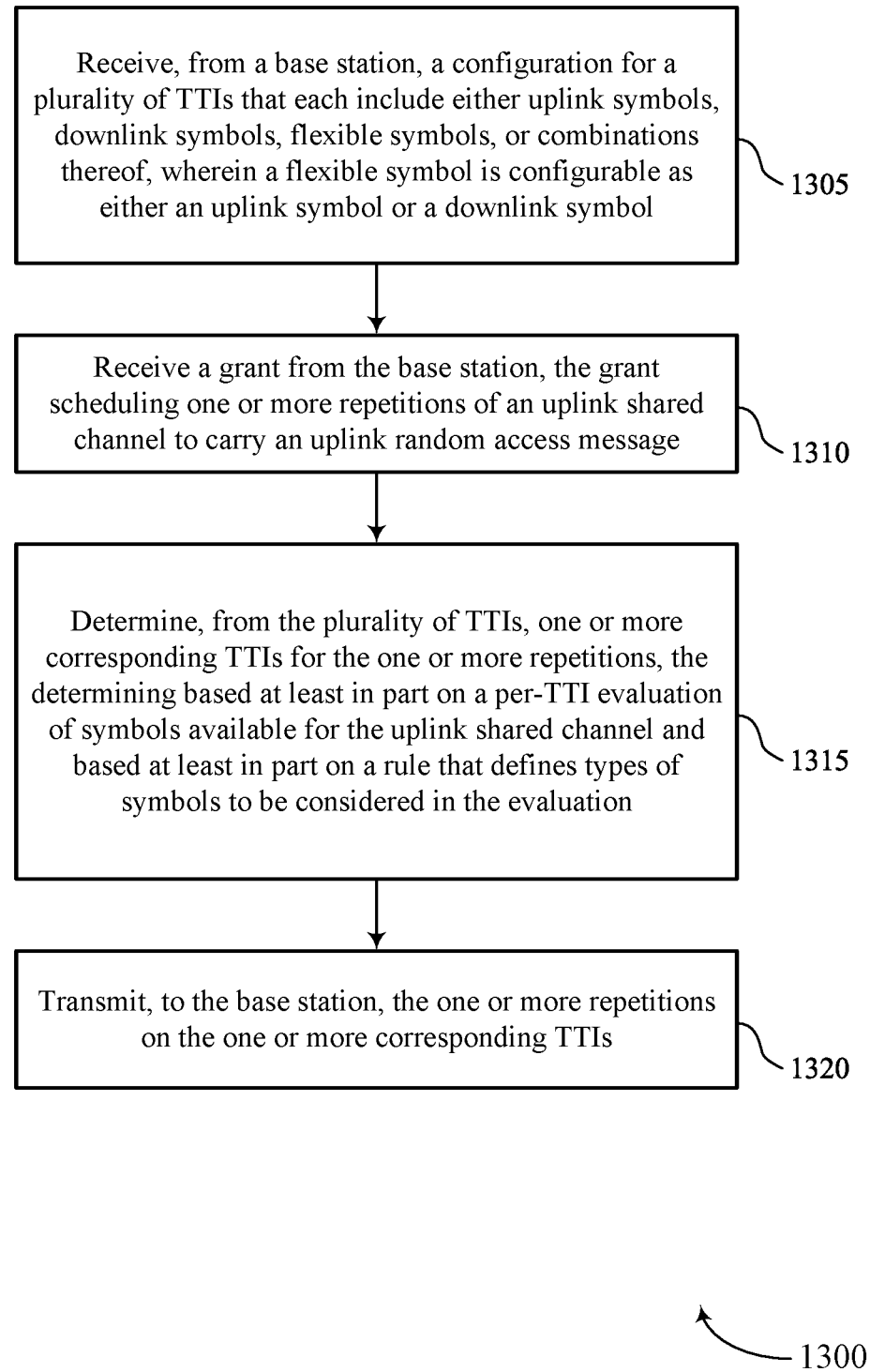
FIGS. 13 through 16 show flowcharts illustrating methods that support available slots for uplink shared channel repetitions in accordance with aspects of the present disclosure.

FIG. 13 shows a flowchart illustrating a method 1300 that supports available slots for uplink shared channel repetitions in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a configuration for a set of multiple transmission time intervals that each include either uplink symbols, downlink symbols, flexible symbols, or combinations thereof, where a flexible symbol is configurable as either an uplink symbol or a downlink symbol. The operations of 1305 may be performed in accordance with examples as disclosed herein. In some examples, aspects of the operations of 1305 may be performed by a symbols component 725 as described with reference to FIG. 7.

At 1310, the method may include receiving a grant from the base station, the grant scheduling one or more repetitions of an uplink shared channel to carry an uplink random access message. The operations of 1310 may be performed in accordance with examples as disclosed herein. In some examples, aspects of the operations of 1310 may be performed by a random access component 730 as described with reference to FIG. 7.

At 1315, the method may include determining, from the set of multiple transmission time intervals, one or more corresponding transmission time intervals for the one or more repetitions, the determining based on a per-transmission time interval evaluation of symbols available for the uplink shared channel and based on a rule that defines types of symbols to be considered in the evaluation. The operations of 1315 may be performed in accordance with examples as disclosed herein. In some examples, aspects of the operations of 1315 may be performed by a TTI component 735 as described with reference to FIG. 7.

At 1320, the method may include transmitting, to the base station, the one or more repetitions on the one or more corresponding transmission time intervals. The operations of 1320 may be performed in accordance with examples as disclosed herein. In some examples, aspects of the operations of 1320 may be performed by a repetitions component 740 as described with reference to FIG. 7.

Figure 14:
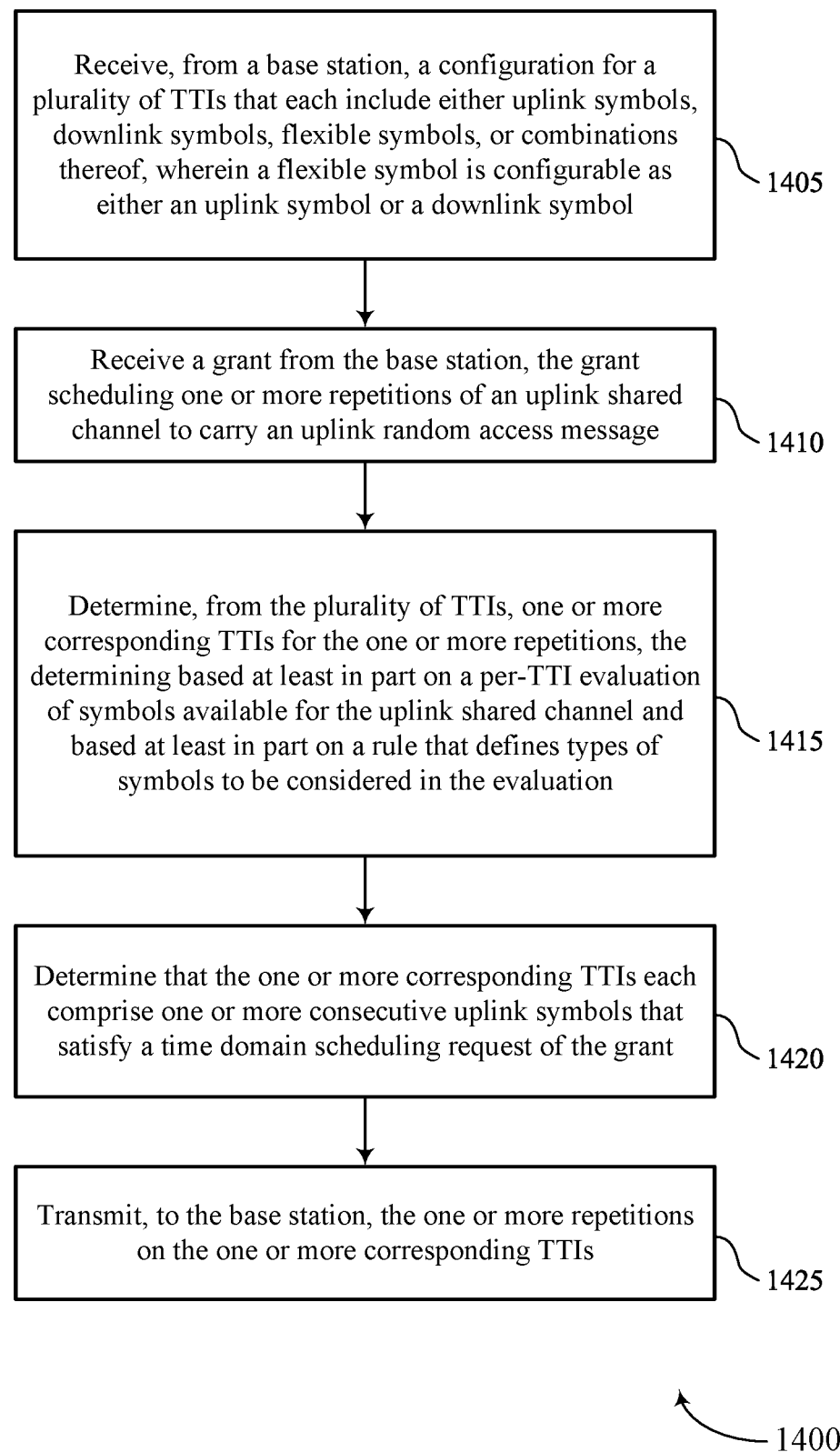

FIG. 14 shows a flowchart illustrating a method 1400 that supports available slots for uplink shared channel repetitions in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a configuration for a set of multiple transmission time intervals that each include either uplink symbols, downlink symbols, flexible symbols, or combinations thereof, where a flexible symbol is configurable as either an uplink symbol or a downlink symbol. The operations of 1405 may be performed in accordance with examples as disclosed herein. In some examples, aspects of the operations of 1405 may be performed by a symbols component 725 as described with reference to FIG. 7.

At 1410, the method may include receiving a grant from the base station, the grant scheduling one or more repetitions of an uplink shared channel to carry an uplink random access message. The operations of 1410 may be performed in accordance with examples as disclosed herein. In some examples, aspects of the operations of 1410 may be performed by a random access component 730 as described with reference to FIG. 7.

At 1415, the method may include determining, from the set of multiple transmission time intervals, one or more corresponding transmission time intervals for the one or more repetitions, the determining based on a per-transmission time interval evaluation of symbols available for the uplink shared channel and based on a rule that defines types of symbols to be considered in the evaluation. The operations of 1415 may be performed in accordance with examples as disclosed herein. In some examples, aspects of the operations of 1415 may be performed by a TTI component 735 as described with reference to FIG. 7.

At 1420, the method may include determining that the one or more corresponding transmission time intervals each include one or more consecutive uplink symbols that satisfy a time domain scheduling request of the grant. The operations of 1420 may be performed in accordance with examples as disclosed herein. In some examples, aspects of the operations of 1420 may be performed by a TTI component 735 as described with reference to FIG. 7.

At 1425, the method may include transmitting, to the base station, the one or more repetitions on the one or more corresponding transmission time intervals. The operations of 1425 may be performed in accordance with examples as disclosed herein. In some examples, aspects of the operations of 1425 may be performed by a repetitions component 740 as described with reference to FIG. 7.

Figure 15:
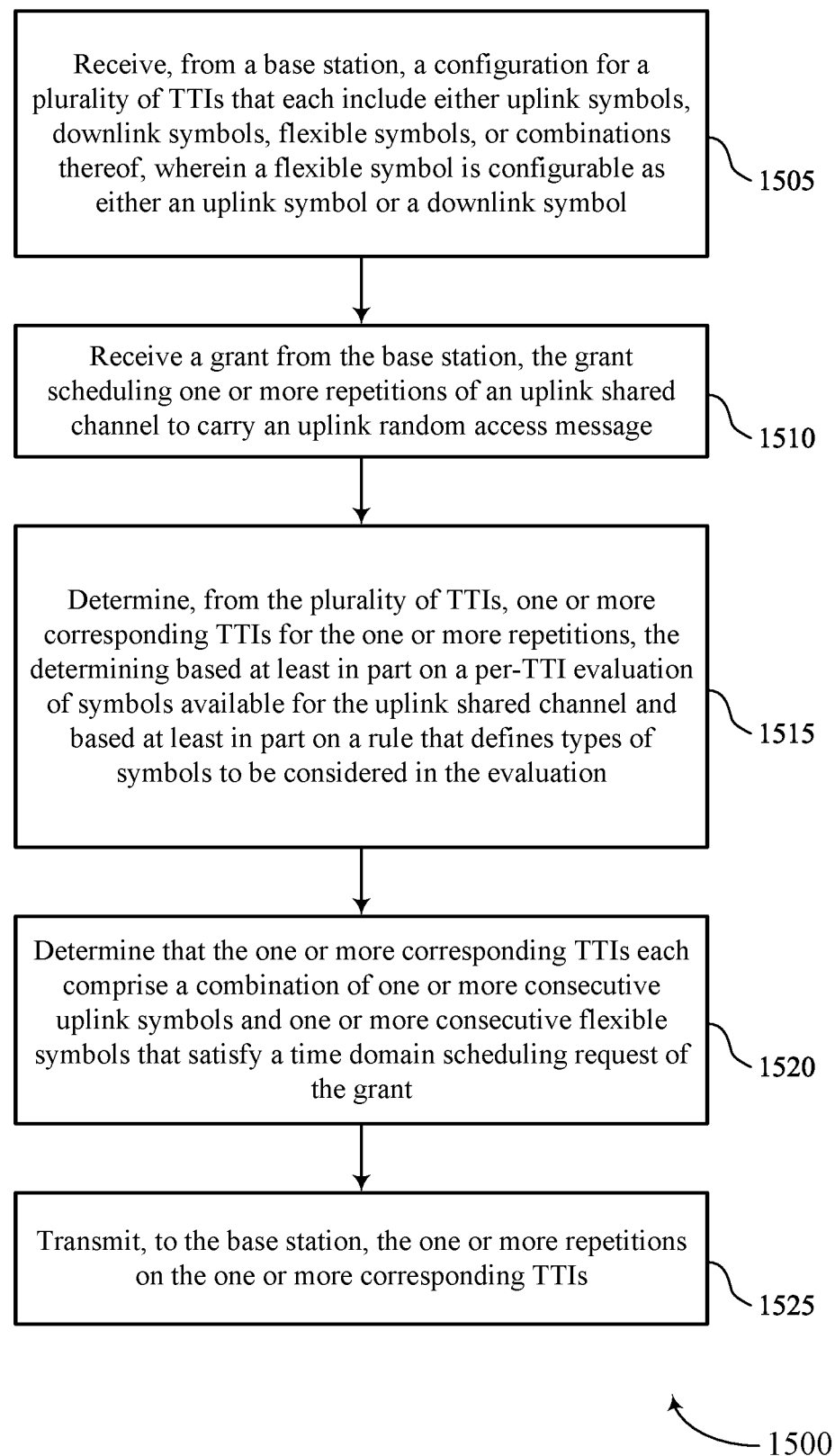

FIG. 15 shows a flowchart illustrating a method 1500 that supports available slots for uplink shared channel repetitions in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a configuration for a set of multiple transmission time intervals that each include either uplink symbols, downlink symbols, flexible symbols, or combinations thereof, where a flexible symbol is configurable as either an uplink symbol or a downlink symbol. The operations of 1505 may be performed in accordance with examples as disclosed herein. In some examples, aspects of the operations of 1505 may be performed by a symbols component 725 as described with reference to FIG. 7.

At 1510, the method may include receiving a grant from the base station, the grant scheduling one or more repetitions of an uplink shared channel to carry an uplink random access message. The operations of 1510 may be performed in accordance with examples as disclosed herein. In some examples, aspects of the operations of 1510 may be performed by a random access component 730 as described with reference to FIG. 7.

At 1515, the method may include determining, from the set of multiple transmission time intervals, one or more corresponding transmission time intervals for the one or more repetitions, the determining based on a per-transmission time interval evaluation of symbols available for the uplink shared channel and based on a rule that defines types of symbols to be considered in the evaluation. The operations of 1515 may be performed in accordance with examples as disclosed herein. In some examples, aspects of the operations of 1515 may be performed by a TTI component 735 as described with reference to FIG. 7.

At 1520, the method may include determining that the one or more corresponding transmission time intervals each include a combination of one or more consecutive uplink symbols and one or more consecutive flexible symbols that satisfy a time domain scheduling request of the grant. The operations of 1520 may be performed in accordance with examples as disclosed herein. In some examples, aspects of the operations of 1520 may be performed by a TTI component 735 as described with reference to FIG. 7.

At 1525, the method may include transmitting, to the base station, the one or more repetitions on the one or more corresponding transmission time intervals. The operations of 1525 may be performed in accordance with examples as disclosed herein. In some examples, aspects of the operations of 1525 may be performed by a repetitions component 740 as described with reference to FIG. 7.

Figure 16:
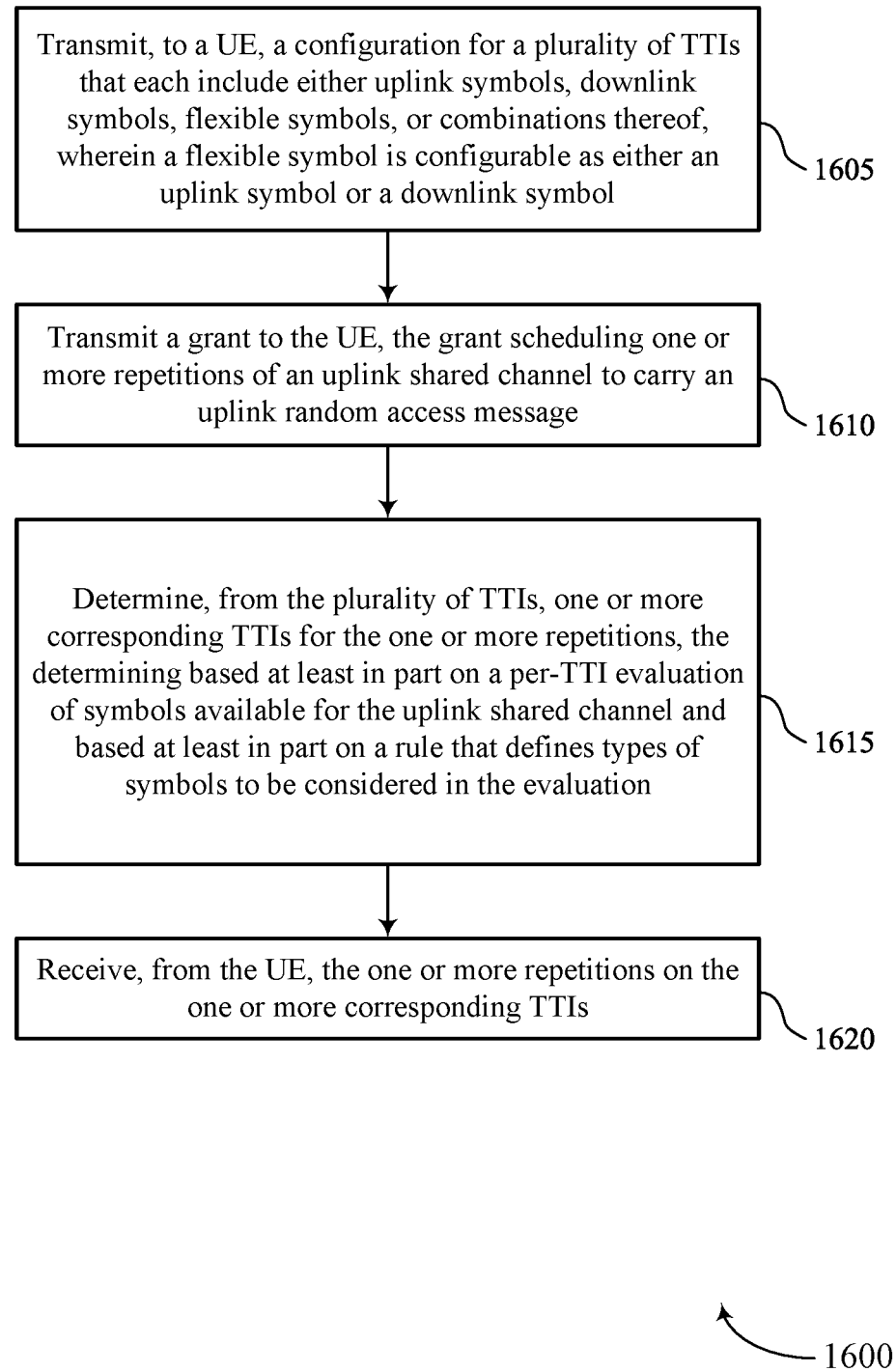

FIG. 16 shows a flowchart illustrating a method 1600 that supports available slots for uplink shared channel repetitions in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a configuration for a set of multiple transmission time intervals that each include either uplink symbols, downlink symbols, flexible symbols, or combinations thereof, where a flexible symbol is configurable as either an uplink symbol or a downlink symbol. The operations of 1605 may be performed in accordance with examples as disclosed herein. In some examples, aspects of the operations of 1605 may be performed by a symbols manager 1125 as described with reference to FIG. 11.

At 1610, the method may include transmitting a grant to the UE, the grant scheduling one or more repetitions of an uplink shared channel to carry an uplink random access message. The operations of 1610 may be performed in accordance with examples as disclosed herein. In some examples, aspects of the operations of 1610 may be performed by a random access manager 1130 as described with reference to FIG. 11.

At 1615, the method may include determining, from the set of multiple transmission time intervals, one or more corresponding transmission time intervals for the one or more repetitions, the determining based on a per-transmission time interval evaluation of symbols available for the uplink shared channel and based on a rule that defines types of symbols to be considered in the evaluation. The operations of 1615 may be performed in accordance with examples as disclosed herein. In some examples, aspects of the operations of 1615 may be performed by a TTI manager 1135 as described with reference to FIG. 11.

At 1620, the method may include receiving, from the UE, the one or more repetitions on the one or more corresponding transmission time intervals. The operations of 1620 may be performed in accordance with examples as disclosed herein. In some examples, aspects of the operations of 1620 may be performed by a repetitions manager 1140 as described with reference to FIG. 11.

The following provides an overview of aspects of the present disclosure:

Aspect 1: A method for wireless communications at a UE, comprising: receiving, from a base station, a configuration for a plurality of transmission time intervals that each include either uplink symbols, downlink symbols, flexible symbols, or combinations thereof, wherein a flexible symbol is configurable as either an uplink symbol or a downlink symbol; receiving a grant from the base station, the grant scheduling one or more repetitions of an uplink shared channel to carry an uplink random access message; determining, from the plurality of transmission time intervals, one or more corresponding transmission time intervals for the one or more repetitions, the determining based at least in part on a per-transmission time interval evaluation of symbols available for the uplink shared channel and based at least in part on a rule that defines types of symbols to be considered in the evaluation; and transmitting, to the base station, the one or more repetitions on the one or more corresponding transmission time intervals.

Aspect 2: The method of aspect 1, wherein determining the one or more corresponding transmission time intervals comprises: determining that the one or more corresponding transmission time intervals each comprise one or more consecutive uplink symbols that satisfy a time domain scheduling request of the grant.

Aspect 3: The method of aspect 2, wherein satisfaction of the time domain scheduling request includes a determination that the one or more consecutive uplink symbols of each of the one or more corresponding transmission time intervals allow for the one or more repetitions to each be transmitted on a same starting symbol within a respective transmission time interval and have a same transmit duration.

Aspect 4: The method of aspect 1, wherein determining the one or more corresponding transmission time intervals comprises: determining that the one or more corresponding transmission time intervals each comprise a combination of one or more consecutive uplink symbols and one or more consecutive flexible symbols that satisfy a time domain scheduling request of the grant.

Aspect 5: The method of aspect 4, wherein satisfaction of the time domain scheduling request includes a determination that the combination of the one or more consecutive uplink symbols and the one or more consecutive flexible symbols of each of the one or more corresponding transmission time intervals allow for the one or more repetitions to each be transmitted on a same starting symbol within a respective transmission time interval and have a same transmit duration.

Aspect 6: The method of any of aspects 1 through 5, wherein determining the one or more corresponding transmission time intervals comprises: determining that the rule defines that only the uplink symbols are to be considered in the evaluation.

Aspect 7: The method of any of aspects 1 through 5, wherein determining the one or more corresponding transmission time intervals comprises: determining that the rule defines that both the uplink symbols and a subset of the flexible symbols are to be considered in the evaluation, wherein the subset of the flexible symbols excludes flexible symbols configured as synchronization signal/physical broadcast channel (SS/PBCH) block symbols.

Aspect 8: The method of any of aspects 1 through 7, further comprising: receiving an indication of the rule in either a system information block or a radio resource control message, wherein the indication pertains to the per-transmission time interval evaluation for all of the plurality of transmission time intervals.

Aspect 9: The method of aspect 8, wherein the indication is a one-bit indication that is indicative of whether flexible symbols are to be considered in the evaluation.

Aspect 10: The method of any of aspects 1 through 7, further comprising: receiving a bit map that indicates the rule for each special transmission time interval of the plurality of transmission time intervals, the bit map received in either a system information block or a radio resource control message, wherein the bit map is indicative of whether flexible symbols are to be considered in the evaluation on a per-special transmission time interval basis, and wherein a special transmission time interval includes at least one flexible symbol.

Aspect 11: The method of aspect 10, further comprising: periodically applying the bit map within sets of transmission time intervals within the plurality of transmission time intervals.

Aspect 12: The method of any of aspects 1 through 11, further comprising: receiving, from the base station, a message comprising capability information corresponding to a capability of the base station to simultaneously transmit and receive signaling, wherein determining the one or more corresponding transmission time intervals is based at least in part on the capability information.

Aspect 13: The method of any of aspects 1 through 12, wherein the grant schedules a Msg3 transmission in a four-step random access procedure, a Msg3 retransmission in the four-step random access procedure, or both.

Aspect 14: The method of any of aspects 1 through 13, wherein the plurality of transmission time intervals comprise a set of slots in a frame or a set of slots in a plurality of frames.

Aspect 15: A method for wireless communications at a base station, comprising: transmitting, to a UE, a configuration for a plurality of transmission time intervals that each include either uplink symbols, downlink symbols, flexible symbols, or combinations thereof, wherein a flexible symbol is configurable as either an uplink symbol or a downlink symbol; transmitting a grant to the UE, the grant scheduling one or more repetitions of an uplink shared channel to carry an uplink random access message; determining, from the plurality of transmission time intervals, one or more corresponding transmission time intervals for the one or more repetitions, the determining based at least in part on a per-transmission time interval evaluation of symbols available for the uplink shared channel and based at least in part on a rule that defines types of symbols to be considered in the evaluation; and receiving, from the UE, the one or more repetitions on the one or more corresponding transmission time intervals.

Aspect 16: The method of aspect 15, wherein determining the one or more corresponding transmission time intervals comprises: determining that the one or more corresponding transmission time intervals each comprise one or more consecutive uplink symbols that satisfy a time domain scheduling request of the grant.

Aspect 17: The method of aspect 16, wherein satisfaction of the time domain scheduling request includes a determination that the one or more consecutive uplink symbols of each of the one or more corresponding transmission time intervals allow for the one or more repetitions to each be transmitted on a same starting symbol within a respective transmission time interval and have a same transmit duration.

Aspect 18: The method of aspect 15, wherein determining the one or more corresponding transmission time intervals comprises: determining that the one or more corresponding transmission time intervals each comprise a combination of one or more consecutive uplink symbols and one or more consecutive flexible symbols that satisfy a time domain scheduling request of the grant.

Aspect 19: The method of aspect 18, wherein satisfaction of the time domain scheduling request includes a determination that the combination of the one or more consecutive uplink symbols and the one or more consecutive flexible symbols of each of the one or more corresponding transmission time intervals allow for the one or more repetitions to each be transmitted on a same starting symbol within a respective transmission time interval and have a same transmit duration.

Aspect 20: The method of any of aspects 15 through 19, wherein determining the one or more corresponding transmission time intervals comprises: determining that the rule defines that only the uplink symbols are to be considered in the evaluation.

Aspect 21: The method of any of aspects 15 through 19, wherein determining the one or more corresponding transmission time intervals comprises: determining that the rule defines that both the uplink symbols and a subset of the flexible symbols are to be considered in the evaluation, wherein the subset of the flexible symbols excludes flexible symbols configured as synchronization signal/physical broadcast channel (SS/PBCH) block symbols.

Aspect 22: The method of any of aspects 15 through 21, further comprising: transmitting an indication of the rule in either a system information block or a radio resource control message, wherein the indication pertains to the per-transmission time interval evaluation for all of the plurality of transmission time intervals.

Aspect 23: The method of aspect 22, wherein the indication is a one-bit indication that is indicative of whether flexible symbols are to be considered in the evaluation.

Aspect 24: The method of any of aspects 15 through 21, further comprising: transmitting a bit map that indicates the rule for each special transmission time interval of the plurality of transmission time intervals, the bit map transmitted in either a system information block or a radio resource control message, wherein the bit map is indicative of whether flexible symbols are to be considered in the evaluation on a per-special transmission time interval basis, and wherein a special transmission time interval includes at least one flexible symbol.

Aspect 25: The method of aspect 24, further comprising: periodically applying the bit map within sets of transmission time intervals within the plurality of transmission time intervals.

Aspect 26: The method of any of aspects 15 through 25, further comprising: transmitting, to the UE, a message comprising capability information corresponding to a capability of the base station to simultaneously transmit and receive signaling, wherein determining the one or more corresponding transmission time intervals is based at least in part on the capability information.

Aspect 27: The method of any of aspects 15 through 26, wherein the grant schedules a Msg3 transmission in a four-step random access procedure, a Msg3 retransmission in the four-step random access procedure, or both.

Aspect 28: The method of any of aspects 15 through 27, wherein the plurality of transmission time intervals comprise a set of slots in a frame or a set of slots in a plurality of frames.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a base station, comprising a processor; memory coupled with the processor; and instructions stored in the memory and executable by the processor to cause the apparatus to perform a method of any of aspects 15 through 28.

Aspect 33: An apparatus for wireless communications at a base station, comprising at least one means for performing a method of any of aspects 15 through 28.

Aspect 34: A non-transitory computer-readable medium storing code for wireless communications at a base station, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

a processor;
memory coupled with the processor; and
instructions stored in the memory and executable by the processor to cause the apparatus to:
receive a configuration for a plurality of transmission time intervals that include either uplink symbols, downlink symbols, flexible symbols, or combinations thereof, wherein a flexible symbol is configurable as either an uplink symbol or a downlink symbol;
receive a grant scheduling one or more repetitions of an uplink shared channel to carry an uplink random access message; and
transmit the one or more repetitions on one or more corresponding transmission time intervals of the plurality of transmission time intervals in accordance with a rule, the one or more corresponding transmission time intervals comprising a combination of one or more consecutive uplink symbols and one or more consecutive flexible symbols, the rule defining that the one or more consecutive uplink symbols and at least a subset of the one or more consecutive flexible symbols are available for the uplink shared channel.

2. The apparatus of claim 1, wherein the combination of the one or more consecutive uplink symbols and the one or more consecutive flexible symbols of each of the one or more corresponding transmission time intervals allow for the one or more repetitions to each be transmitted on a same starting symbol within a respective transmission time interval and have a same transmit duration.

3. The apparatus of claim 2, wherein the instructions stored in the memory and executable by the processor further cause the apparatus to:
receive an indication of the rule in either a system information block or a radio resource control message, wherein the indication pertains to a per-transmission time interval evaluation of symbols available for the uplink shared channel for all of the plurality of transmission time intervals.

4. The apparatus of claim 3, wherein the indication is a one-bit indication that is indicative of whether the flexible symbols are to be considered in the evaluation.

5. The apparatus of claim 3, wherein the instructions stored in the memory and executable by the processor further cause the apparatus to:
receive a bit map that indicates the rule for each special transmission time interval of the plurality of transmission time intervals, the bit map received in either a system information block or a radio resource control message, wherein the bit map is indicative of whether the flexible symbols are to be considered in a per-transmission time interval evaluation of symbols available for the uplink shared channel, and wherein a special transmission time interval includes at least one flexible symbol.

6. The apparatus of claim 5, wherein the instructions stored in the memory and executable by the processor further cause the apparatus to:
periodically apply the bit map within sets of transmission time intervals within the plurality of transmission time intervals.

7. The apparatus of claim 1, wherein the subset of the flexible symbols excludes flexible symbols configured as synchronization signal/physical broadcast channel (SS/PBCH) block symbols.

8. The apparatus of claim 1, wherein the instructions stored in the memory and executable by the processor further cause the apparatus to:
receive a message comprising capability information corresponding to a capability of a network device to simultaneously transmit and receive signaling, wherein determining the one or more corresponding transmission time intervals is based at least in part on the capability information.

9. The apparatus of claim 1, wherein the grant schedules a Msg3 transmission in a four-step random access procedure, a Msg3 retransmission in the four-step random access procedure, or both.

10. The apparatus of claim 1, wherein the plurality of transmission time intervals comprise a set of slots in a frame or a set of slots in a plurality of frames.

11. A method for wireless communications at a user equipment (UE), comprising:
receiving a configuration for a plurality of transmission time intervals that include either uplink symbols, downlink symbols, flexible symbols, or combinations thereof, wherein a flexible symbol is configurable as either an uplink symbol or a downlink symbol;
receiving a grant scheduling one or more repetitions of an uplink shared channel to carry an uplink random access message; and
transmitting the one or more repetitions on one or more corresponding transmission time intervals of the plurality of transmission time intervals in accordance with a rule, the one or more corresponding transmission time intervals comprising a combination of one or more consecutive uplink symbols and one or more consecutive flexible symbols, the rule defining that uplink symbols and at least a subset of the flexible symbols are available for the uplink shared channel.

12. The method of claim 11, wherein the combination of the one or more consecutive uplink symbols and the one or more consecutive flexible symbols of each of the one or more corresponding transmission time intervals allow for the one or more repetitions to each be transmitted on a same starting symbol within a respective transmission time interval and have a same transmit duration.

13. The method of claim 11, wherein the grant schedules a Msg3 transmission in a four-step random access procedure, a Msg3 retransmission in the four-step random access procedure, or both.

14. An apparatus for wireless communications at a network device, comprising:
a processor;
memory coupled with the processor; and
instructions stored in the memory and executable by the processor to cause the apparatus to:
transmit a configuration for a plurality of transmission time intervals that include either uplink symbols, downlink symbols, flexible symbols, or combinations thereof, wherein a flexible symbol is configurable as either an uplink symbol or a downlink symbol;
transmit a grant scheduling one or more repetitions of an uplink shared channel to carry an uplink random access message; and
receive the one or more repetitions on one or more corresponding transmission time intervals of the plurality of transmission time intervals in accordance with a rule, the one or more corresponding transmission time intervals comprising a combination of one or more consecutive uplink symbols and one or more consecutive flexible symbols, the rule defining that uplink symbols and at least a subset of the flexible symbols are available for the uplink shared channel.

15. The apparatus of claim 14, wherein the combination of the one or more consecutive uplink symbols and the one or more consecutive flexible symbols of each of the one or more corresponding transmission time intervals allow for the one or more repetitions to each be transmitted on a same starting symbol within a respective transmission time interval and have a same transmit duration.

16. The apparatus of claim 14, wherein the subset of the flexible symbols excludes flexible symbols configured as synchronization signal/physical broadcast channel (SS/PBCH) block symbols.

17. The apparatus of claim 14, wherein the grant schedules a Msg3 transmission in a four-step random access procedure, a Msg3 retransmission in the four-step random access procedure, or both.

18. The apparatus of claim 14, wherein the instructions stored in the memory and executable by the processor further cause the apparatus to:

transmitting an indication of the rule in either a system information block or a radio resource control message, wherein the indication pertains to a per-transmission time interval evaluation of symbols available for the uplink shared channel for all of the plurality of transmission time intervals.

19. The apparatus of claim 14, wherein the instructions stored in the memory and executable by the processor further cause the apparatus to:

transmit a bit map that indicates the rule for each special transmission time interval of the plurality of transmission time intervals, the bit map transmitted in either a system information block or a radio resource control a per-transmission time interval evaluation of symbols available for the uplink shared channel, and wherein a special transmission time interval includes at least one flexible symbol.

20. The apparatus of claim 14, wherein the instructions stored in the memory and executable by the processor further cause the apparatus to:

transmit a message comprising capability information corresponding to a capability of the network device to simultaneously transmit and receive signaling, wherein determining the one or more corresponding transmission time intervals is based at least in part on the capability information.

* * * * *